US011308743B2

(12) United States Patent
Tagawa et al.

(10) Patent No.: US 11,308,743 B2
(45) Date of Patent: *Apr. 19, 2022

(54) GATE APPARATUS, CONTROL METHOD OF GATE APPARATUS, AND STORAGE MEDIUM

(71) Applicant: NEC CORPORATION, Tokyo (JP)

(72) Inventors: Risa Tagawa, Tokyo (JP); Noriyuki Hiramoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,918

(22) Filed: Apr. 20, 2020

(65) Prior Publication Data

US 2020/0242864 A1 Jul. 30, 2020

Related U.S. Application Data

(63) Continuation of application No. 16/368,154, filed on Mar. 28, 2019, now Pat. No. 10,699,502.

(30) Foreign Application Priority Data

Oct. 12, 2018 (WO) .................. PCT/JP2018/038218

(51) Int. Cl.
*G06K 9/00* (2006.01)
*G07C 9/00* (2020.01)
*E06B 11/02* (2006.01)

(52) U.S. Cl.
CPC .......... *G07C 9/00563* (2013.01); *E06B 11/02* (2013.01); *G06K 9/00255* (2013.01); *G06K 9/00288* (2013.01)

(58) Field of Classification Search
CPC ........... G07C 9/00563; G06K 9/00288; G06K 9/00255; E06B 11/02
(Continued)

(56) References Cited

U.S. PATENT DOCUMENTS 5,542,849 A * 8/1996 Douglass ................. G09B 1/00
434/236
6,801,640 B1 * 10/2004 Okubo ..................... G07C 9/00
382/118
(Continued)

FOREIGN PATENT DOCUMENTS

JP 2002-352291 A 12/2002
JP 2007-249819 A 9/2007
(Continued)

OTHER PUBLICATIONS

International Search Report of PCT/JP2018/038218 dated Nov. 13, 2018.
(Continued)

*Primary Examiner* — Van D Huynh
(74) *Attorney, Agent, or Firm* — Sughrue Mion, PLLC

(57) ABSTRACT

A gate apparatus includes: an exit gate door; a first biometrics information acquisition unit that acquires, from a user who moves toward the exit gate door in a closed state, first target biometrics information to be compared with registered biometrics information registered in advance; a second biometrics information acquisition unit that acquires second target biometrics information to be compared with the registered biometrics information from the use who stops in front of the exit gate door when there is no matching in a comparison between the first target biometrics information and the registered biometrics information or the comparison is unable to be performed; and a door control unit that opens the closed exit gate door in accordance with a result of a comparison between the first target biometrics information or the second target biometrics information and the registered biometrics information.

15 Claims, 29 Drawing Sheets

(58) Field of Classification Search
USPC .......................................................... 382/118
See application file for complete search history.

(56) References Cited

U.S. PATENT DOCUMENTS

| | | | | |
|---|---|---|---|---|
| 7,136,513 | B2* | 11/2006 | Waehner | G06K 9/2036 |
| | | | | 382/118 |
| 2002/0198731 | A1* | 12/2002 | Barnes | G06Q 50/265 |
| | | | | 705/325 |
| 2003/0039380 | A1* | 2/2003 | Sukegawa | G06K 9/00288 |
| | | | | 382/118 |
| 2006/0204050 | A1 | 9/2006 | Takizawa | |
| 2006/0262187 | A1* | 11/2006 | Takizawa | G06K 9/00912 |
| | | | | 348/77 |
| 2017/0046808 | A1* | 2/2017 | Parrish | G06Q 10/00 |
| 2017/0140526 | A1* | 5/2017 | Chen | G06K 9/4671 |
| 2018/0047227 | A1* | 2/2018 | Beavers | G06F 21/40 |
| 2018/0048641 | A1* | 2/2018 | Zheng | H04L 63/0846 |
| 2019/0050631 | A1* | 2/2019 | Hayase | G06T 7/38 |

FOREIGN PATENT DOCUMENTS

| | | |
|---|---|---|
| JP | 2016-053896 A | 4/2016 |
| JP | 2018-109935 A | 7/2018 |
| WO | 2017/199556 A1 | 11/2017 |
| WO | 2018/061812 A1 | 4/2018 |

OTHER PUBLICATIONS

Extended European Search Report for EP Application No. EP 18936738.6 dated Sep. 21, 2021.
Japanese Office Action for JP Application No. 2020-549931 dated Feb. 3, 2022 with English Translation.

* cited by examiner

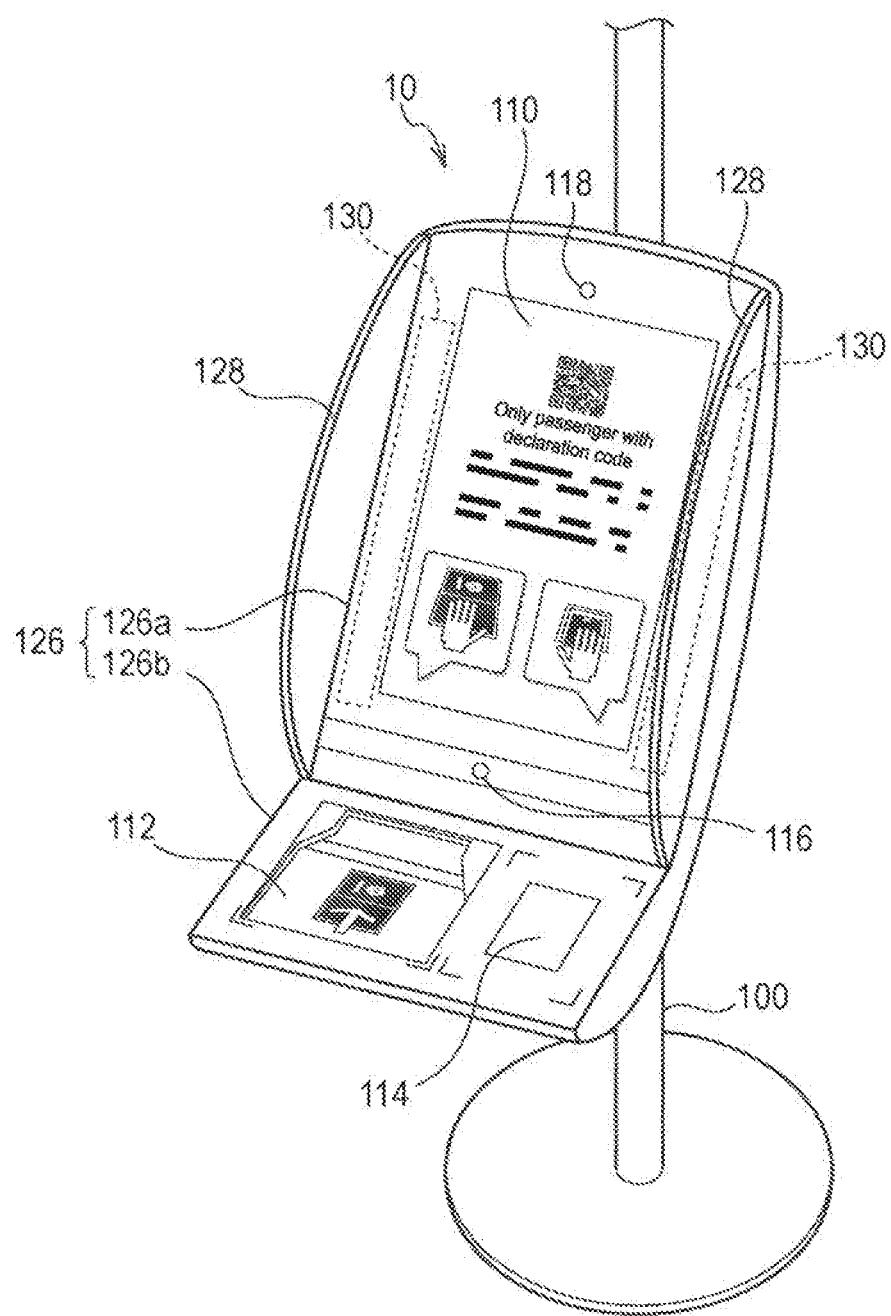

FIG. 15A

SHE

SHE10

Declaration information | Declaration code

Taro Yamada

Flight number

Origin

Date of entry

1. Are you bringing the following?

No to all ○

Yes　No

① Articles such as drugs, guns, explosives, etc. prohibited or restricted to bring into Japan　○　○

② Gold bullions or gold products　○　○

③ Purchases, souvenirs, gifts, etc exceeding duty-free allowance　○　○

④ Commercial goods or samples　○　○

⑤ Any items you have been requested from someone else to bring　○　○

FIG. 18B

SKC

Confirmation of declaration

Personal information
Name        Taro Yamada
Address     1-2-3, XX, YYward, Tokyo
Telephone   03-1234-5678
Occupation  company employee

[Correct]

Declaration of accompanied articles, unaccompanied articles
Flight number   AB246
Origin          Los Angeles
Date of entry   September 28, 2018

[Correct]

1. Are you bringing the following?

| | |
|---|---|
| 1. Articles such as drugs, guns, explosives, etc. prohibited or restricted to bring into Japan | NO |
| 2. Gold bullions or gold products | NO |
| 3. Purchases, souvenirs, gifts, etc. exceeding duty-free allowance | NO |
| 4. Commercial goods or samples | NO |
| 5. Any items you have been requested from someone else to bring | NO |

⋮

[Cancel]    [Confirm]

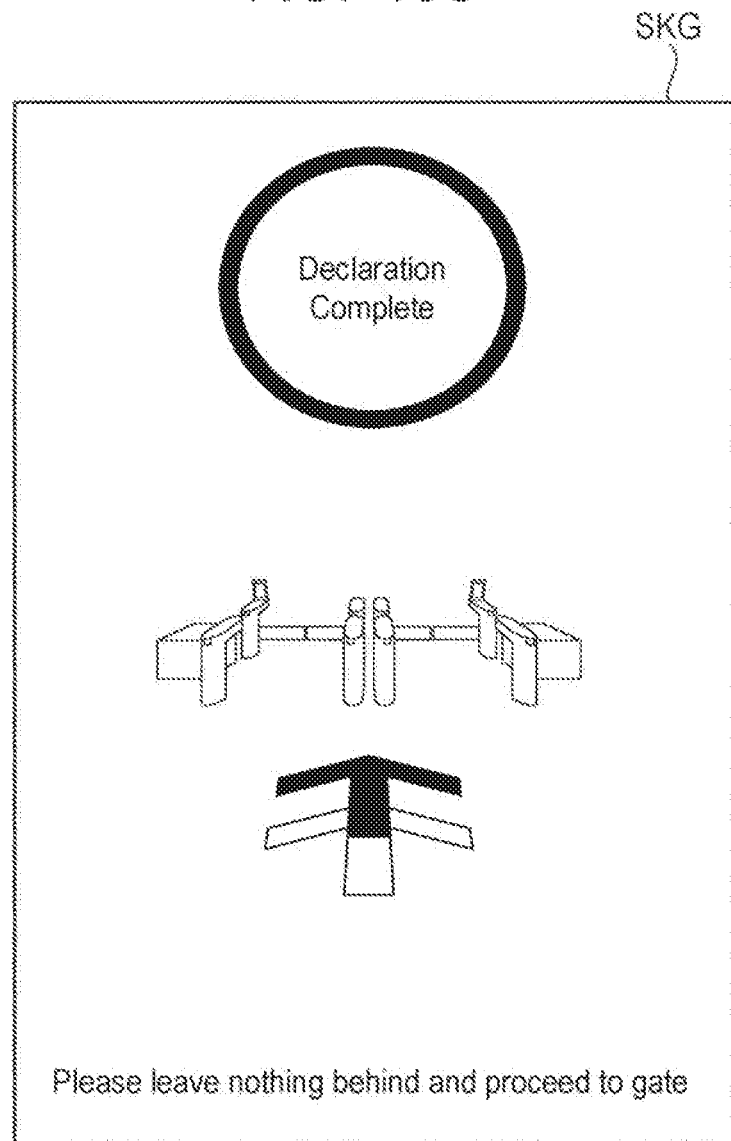

GATE APPARATUS, CONTROL METHOD OF GATE APPARATUS, AND STORAGE MEDIUM

INCORPORATION BY REFERENCE

This application is a Continuation of application Ser. No. 16/368,154 filed on Mar. 28, 2019, which is based upon and claims the benefit of priority from International Application No. PCT/JP2018/038218, filed on Oct. 12, 2018, the disclosure of which is incorporated herein in its entirety by reference.

TECHNICAL FIELD

The present invention relates to a gate apparatus, a control method of the gate apparatus, and a storage medium.

BACKGROUND ART

International Publication No. WO 2018/061812 discloses a gate apparatus applied to a gate system that automatically performs a face authentication operation performed in an inspection of immigration. The gate apparatus disclosed in International Publication No. WO 2018/061812 has a face authentication device that compares a face image acquired from a camera with a face image acquired from a passport reader.

SUMMARY

In the gate apparatus disclosed in International Publication No. WO 2018/061812, however, since the face of a subject who placed a passport on a passport reader in front of the face authentication device is captured by a camera, it is difficult for the subject to pass through the gate apparatus in a short time.

In view of the problem described above, the example object of the present invention is to provide a gate apparatus, a control method of the gate apparatus, and a storage medium that can reduce the time required for a user to pass through a gate apparatus.

According to one example aspect of the present invention, provided is a gate apparatus including: an exit gate door; a first biometrics information acquisition unit that acquires, from a user who moves toward the exit gate door in a closed state, first target biometrics information to be compared with registered biometrics information registered in advance; a second biometrics information acquisition unit that acquires second target biometrics information to be compared with the registered biometrics information from the use who stops in front of the exit gate door when there is no matching in a comparison between the first target biometrics information and the registered biometrics information or the comparison is unable to be performed; and a door control unit that opens the exit gate door in the closed state in accordance with a result of a comparison between the first target biometrics information or the second target biometrics information and the registered biometrics information.

According to another example aspect of the present invention, provided is a gate apparatus including: an exit gate door; a first biometrics information acquisition unit that acquires, from a user who moves toward the exit gate door in a closed state, first target biometrics information to be compared with registered biometrics information registered in advance; a second biometrics information acquisition unit that acquires second target biometrics information to be compared with the registered biometrics information from the use who stops in front of the exit gate door when a direction of a face of the user moving toward the exit gate door in the closed state is not directed to the exit gate door or a wearing item is worn by the face of the user; and a door control unit that opens the exit gate door in the closed state in accordance with a result of a comparison between the first target biometrics information or the second target biometrics information and the registered biometrics information.

According to yet another example aspect of the present invention, provided is a gate apparatus including: an exit gate door; a biometrics information acquisition unit that acquires target biometrics information to be compared with registered biometrics information registered in advance from a user who moves toward the exit gate door in a closed state or stops in front of the exit gate door; and a door control unit that opens the exit gate door in the closed state in accordance with a determination result for declaration information associated with the registered biometrics information matching the target biometrics information.

According to yet another example aspect of the present invention, provided is a control method of a gate apparatus having an exit gate door, and the control method includes: acquiring, from a user who moves toward the exit gate door in a closed state, first target biometrics information to be compared with registered biometrics information registered in advance; acquiring second target biometrics information to be compared with the registered biometrics information from the use who stops in front of the exit gate door when there is no matching in a comparison between the first target biometrics information and the registered biometrics information or the comparison is unable to be performed; and opening the exit gate door in the closed state in accordance with a result of a comparison between the first target biometrics information or the second target biometrics information and the registered biometrics information.

According to yet another example aspect of the present invention, provided is a non-transitory storage medium storing a program that causes a gate apparatus having an exit gate door to perform: acquiring, from a user who moves toward the exit gate door in a closed state, first target biometrics information to be compared with registered biometrics information registered in advance; acquiring second target biometrics information to be compared with the registered biometrics information from the use who stops in front of the exit gate door when there is no matching in a comparison between the first target biometrics information and the registered biometrics information or the comparison is unable to be performed; and opening the exit gate door in the closed state in accordance with a result of a comparison between the first target biometrics information or the second target biometrics information and the registered biometrics information.

BRIEF DESCRIPTION OF THE DRAWINGS

FIG. 4B is a schematic diagram illustrating the external appearance of the kiosk terminal according to one example embodiment of the present invention.

FIG. 15A is a schematic diagram illustrating one example of a declaration information entry window on the mobile terminal according to one example embodiment of the present invention.

FIG. 18B is a schematic diagram illustrating one example of a declaration detail confirmation window on the kiosk terminal according to one example embodiment of the present invention.

FIG. 18C is a schematic diagram illustrating one example of a guide window on the kiosk terminal according to one example embodiment of the present invention.

EXAMPLE EMBODIMENT

One Example Embodiment

An information processing apparatus, a gate apparatus, an information processing method, and a control method of the gate apparatus according to one example embodiment of the present invention will be described by using FIG. 1 to FIG. 20.

Figure 1:
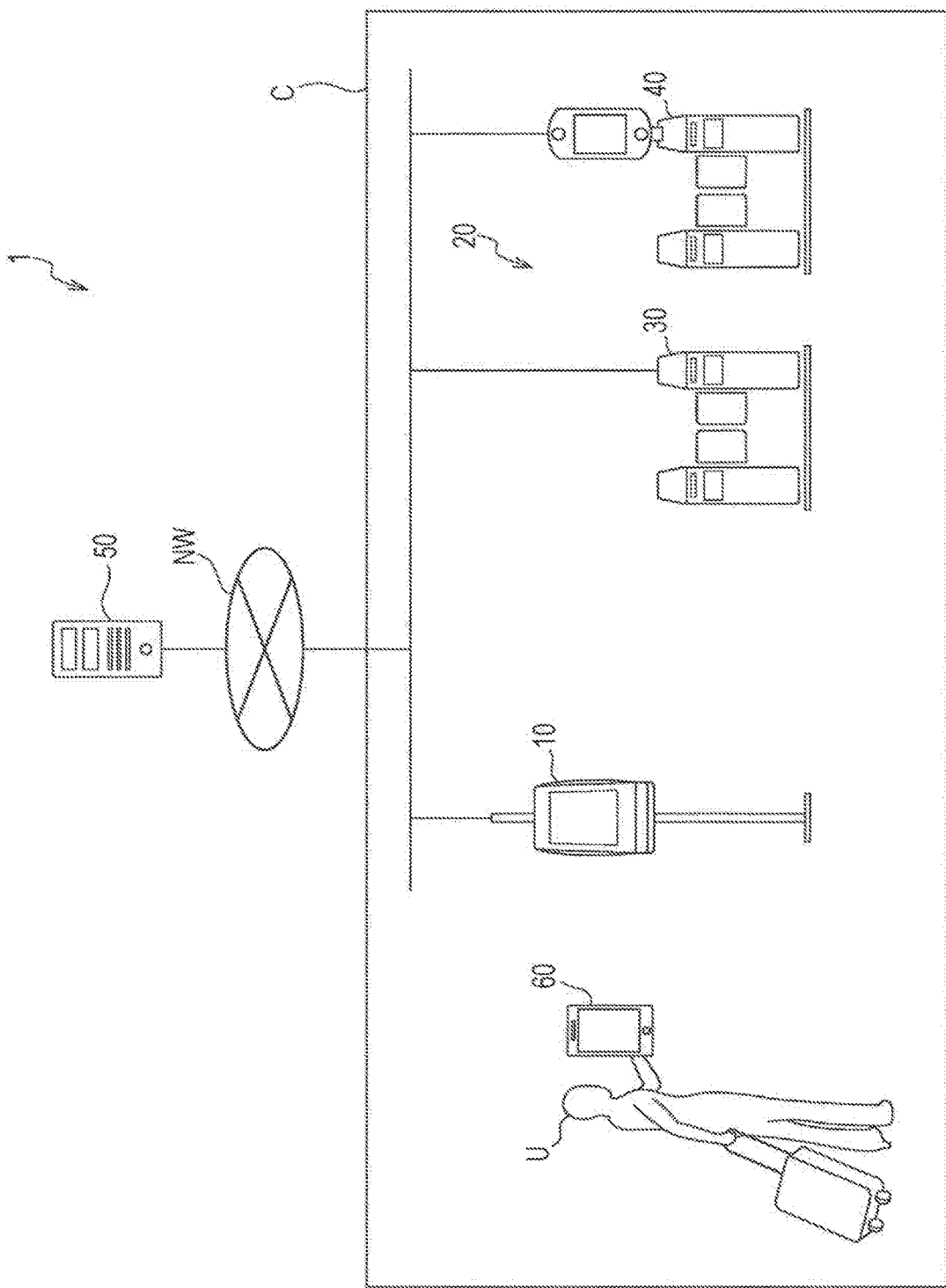
FIG. 1 is a schematic diagram illustrating the entire configuration of an information processing system according to one example embodiment of the present invention.
Figure 2:
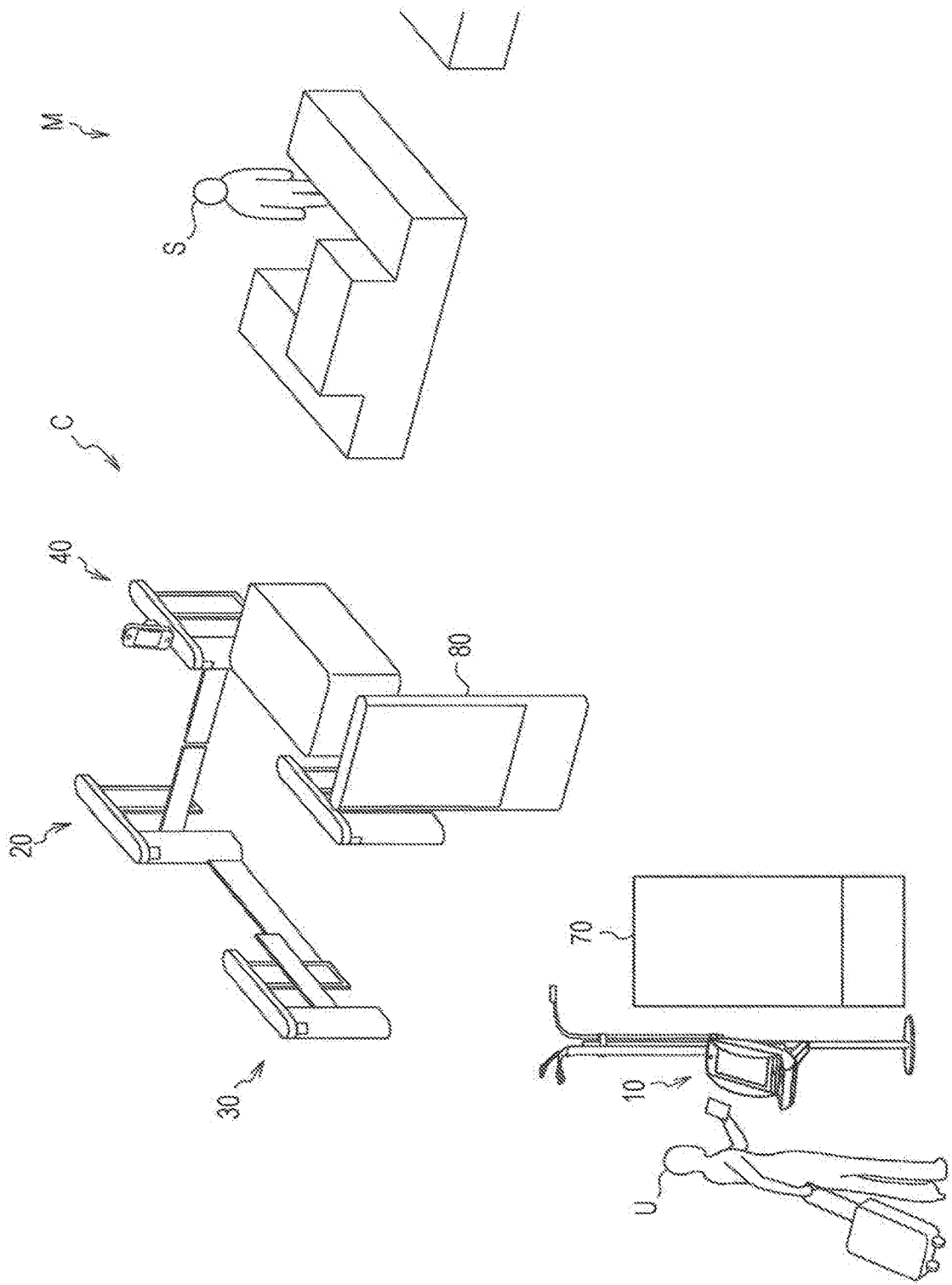
FIG. 2 is a schematic diagram illustrating a customs inspection site in which a kiosk terminal and an electronic gate are installed according to one example embodiment of the present invention.

First, the entire configuration of the information processing system according to the present example embodiment will be described by using FIG. 1 and FIG. 2. FIG. 1 is a schematic diagram illustrating the entire configuration of the information processing system according to the present example embodiment. FIG. 2 is a schematic diagram illustrating a customs inspection site in which a kiosk terminal and an electronic gate according to the present example embodiment are installed.

As illustrated in FIG. 1, an information processing system 1 according to the present example embodiment includes a kiosk terminal 10, an electronic gate 20, a management server 50, and a mobile terminal 60. The electronic gate 20 has an entrance gate terminal 30 and an exit gate terminal 40. The information processing system 1 is a system that accepts declaration in custom procedures at immigration of the users U, such as passengers, crews, or the like who enter a country from foreign countries in an airport, a seaport, or the like and controls the electronic gate 20 through which a particular user U who has completed declaration passes, for example.

For example, when the information processing system 1 is introduced in an airport of Japan, the user U may be a passenger or a member of a crew who arrived at the airport from a foreign country by an airplane, which may be a Japanese who returns to and enters Japan from a foreign country where he/she has been, a foreigner who enters Japan from a foreign country, or the like. More specifically, customs declaration, which is declaration in a custom procedure accepted in the information processing system 1, may be declaration in baggage clearance, for example, which is declaration of the same requirement as in the declaration by Customs Form C No. 5360, Export/Import Declaration for Consigned Articles (Accompanied Articles/ Unaccompanied Articles) in a case of declaration in Japan.

The management server 50 is installed within a customs facility, for example. The kiosk terminal 10 and the electronic gate 20 are installed in a customs inspection site C where customs inspection is performed in an airport, a seaport, or the like, for example.

As illustrated in FIG. 2, the kiosk terminal 10 is installed near the entrance of the customs inspection site C that the user U enters. Near the kiosk terminal 10, a digital signage terminal 70 is installed that displays a moving image or a static image to guide how to carry out a procedure with the kiosk terminal 10. Further, the electronic gate 20 and a manned booth M are installed at the exit of the customs inspection site C. Near the entrance gate terminal 30 of the electronic gate 20, a digital signage terminal 80 is installed that displays and provides guidance of notes in passing through the electronic gate 20 by a moving image or a static image. In the manned booth M, for example, face-to-face customs inspection such as reception of declaration in a customs procedure, inspection of baggage, or the like is performed by a customs officer S.

The mobile terminal 60 is a terminal held or carried and used by the user U. In the mobile terminal 60, a customs declaration application for performing custom declaration in the kiosk terminal 10 is installed. The user U may use a declaration code generated by the customs declaration application of the mobile terminal 60 to perform customs declaration in the kiosk terminal 10, as described later.

The kiosk terminal 10, the entrance gate terminal 30, the exit gate terminal 40, and the management server 50 are connected to a network NW. The network NW is formed of Wide Area Network (WAN), Local Area Network (LAN), a mobile communication network, or the like. The kiosk terminal 10 and the management server 50 are able to communicate with each other via the network NW. The entrance gate terminal 30 and the exit gate terminal 40 are able to communicate with each other via the network NW or without via the network NW. The exit gate terminal 40 and the management server 50 are able to communicate with each other via the network NW. The mobile terminal 60 is able to communicate with a server such as the management server 50 or the like via the network NW.

Next, each component in the information processing system 1 according to the present example embodiment will be further described by using FIG. 3 to FIG. 14.

Figure 3:
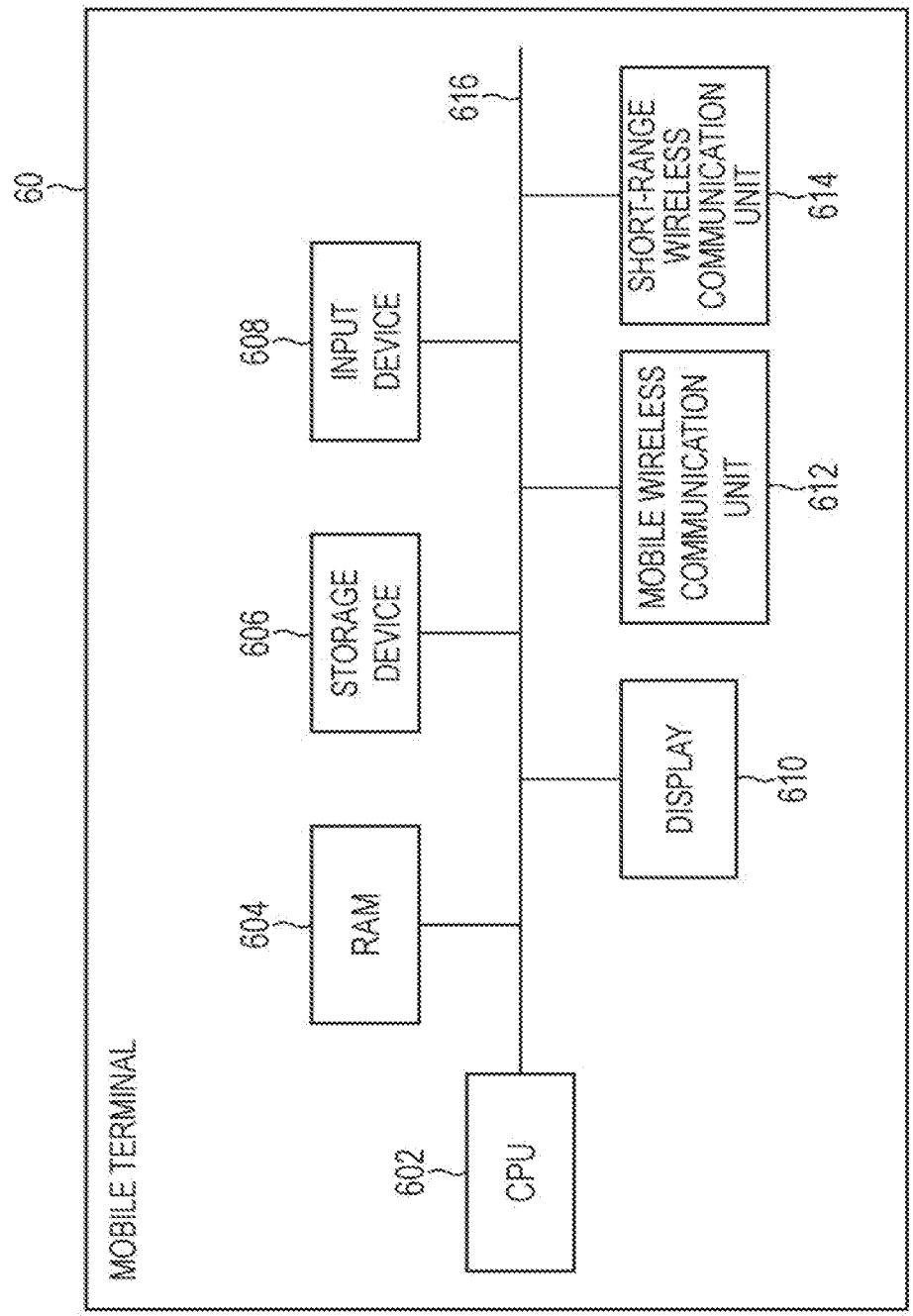
FIG. 3 is a block diagram illustrating one example of a hardware configuration of a mobile terminal according to one example embodiment of the present invention.

First, the configuration of the mobile terminal 60 will be described by using FIG. 3. FIG. 3 is a block diagram illustrating an example of the hardware configuration of the mobile terminal 60.

The mobile terminal 60 is a terminal held or carried and used by the user U, which is a mobile information device such as a smartphone, a tablet terminal, a mobile phone, or the like, for example. As illustrated in FIG. 3, the mobile terminal 60 has a central processing unit (CPU) 602, a random access memory (RAM) 604, a storage device 606, an input device 608, a display 610, a mobile wireless communication unit 612, and a short-range wireless communication unit 614. The CPU 602, the RAM 604, the storage device 606, the input device 608, the display 610, the mobile wireless communication unit 612, and the short-range wireless communication unit 614 are connected to the bus line 616.

The CPU 602 functions as a control unit that operates by executing a program stored in the storage device 606 and controls the operation of the entire mobile terminal 60. Further, the CPU 602 executes an application program stored in the storage device 606 to perform various processes as the mobile terminal 60. The RAM 604 provides a memory field necessary for the operation of the CPU 602.

For example, a customs declaration application used for performing customs declaration on the kiosk terminal 10 is installed in the storage device 606. The CPU 602 can perform various processes by which the user U performs customs declaration by executing the customs declaration application.

More specifically, the CPU 602 can accept entry by the user U of declaration information that is necessary for customs declaration, for example. The declaration information is information of the same detail as requirements to be filled in a Declaration for accompanied articles/unaccompanied articles, for example. That is, the declaration information includes information necessary for customs declaration such as a name of the user U, a current address or a stay address in a country to enter, an occupation, a birthday, a passport number, a flight number, an origin, a date of entry, details to be declared in customs declaration, for example.

Further, the CPU 602 can generate declaration code, which is a code such as a two-dimensional code including declaration information input by the user U, and cause the display 610 to display the generated declaration code, for example, as described later. The mobile terminal 60 can function as a medium to display a declaration code.

The declaration code is not particularly limited as long as it can include declaration information and may be, for example, a two-dimensional code such as a QR code (registered trademark). Further, the declaration code may be one-dimensional code such as a barcode, for example. The CPU 602 may generate a declaration code with a term of validity that sets a term of validity. The CPU 602 can cause the display 610 to display the set term of validity together with the declaration code. The declaration code with the term of validity becomes invalid when date and time set as the term of validity has expired after the generation thereof. With a term of validity being set in a declaration code, it is possible to urge the user U to perform customs declaration as soon as possible after the generation of the declaration code.

Note that, when the user U is accompanied by family that is a companion, each of the user U and the accompanying family may perform customs declaration by using each mobile terminal 60, or the user U may perform customs declaration as a representative of the family. When the user U performs customs declaration as a representative of the family, the CPU 602 can generate a declaration code for the accompanying family used by the accompanying family on the kiosk terminal 10 and display the generated declaration code on the display 610 in addition to the declaration code used by the user U by himself/herself on the kiosk terminal 10. The accompanies family may use the declaration code for the accompanying family displayed on the mobile terminal 60 of the user U and use the kiosk terminal 10 in the same manner as the user U. Further, the accompanying family is guided to the electronic gate 20 or the manned booth M in the same manner as the user U after the use of the kiosk terminal 10.

Further, the code display medium that displays a declaration code is not necessarily required to be the mobile terminal 60 and may be other medium. For example, the declaration code may be printed in a sheet as a code display medium.

Further, the customs declaration application supports multiple languages such as the Japanese language, the English language, the Chinese language, the Korean language, or the like, for example. Thereby, on the customs declaration application, display and entry are available with a language selected and set out of a plurality of languages in accordance with the language setting of the mobile terminal 60, for example. Further, on the customs declaration application, display and entry may be available with a language selected and set out of a plurality of languages in accordance with the setting in the application in addition to the language setting of the mobile terminal 60, for example. The customs declaration application can be used in a use language that is a language set in such a way.

The CPU 602 can further include language information in the declaration code, which is information indicating the use language in the customs declaration application. For example, the language information is information indicating the language set in accordance with the language setting of the mobile terminal 60 or, when a language is set as the setting within the customs declaration application, information regarding the set language.

The storage device 606 is formed of a storage medium such as a non-volatile memory, a hard disk drive, or the like and functions as a storage unit. The storage device 606 stores a program executed by the CPU 602, data referenced by the CPU 602 in execution of the program, or the like. The storage device 606 stores a customs declaration application as an application program executed by the CPU 602.

The storage device 606 can store information such as declaration information input by the customs declaration application. Further, the storage device 606 can store a declaration code generated by the customs declaration application.

The input device 608 is a touchscreen embedded in the display 610, for example. The input device 608 functions as an input unit that accepts entry from the user U. The user U may input various information or input an instruction of execution of a process to the mobile terminal 60 via the input device 608. For example, the user U may input declaration information or input an instruction of generating a declaration code via the input device 608, which is a touchscreen, to the mobile terminal 60 that executes the customs declaration application.

The display 610 functions as a display unit that displays various windows to the user U. For example, on the mobile terminal 60 that executes the customs declaration application, the display 610 displays a declaration information entry window that accepts entry of declaration information, a declaration code display window that displays a declaration code, or the like as described later.

The mobile wireless communication unit 612 is connected to the network NW via a mobile communication network under the control of the CPU 602. The communication scheme of the mobile wireless communication unit 612 is not particularly limited and may be, for example, a third generation mobile communication scheme, a Long Term Evolution (LTE) scheme, a fourth generation mobile communication scheme, or the like.

The short-range wireless communication unit 614 wirelessly communicates with an access point, an external device, or the like under the control of the CPU 602 and is connected to the network NW via an access point in a premise of an airport or the like, for example. Without being limited in particular, the communication scheme of the short-range wireless communication unit 614 may be, for example, a wireless LAN scheme such as Wi-Fi (registered trademark), a Bluetooth (registered trademark) communication scheme, a Near Field Communication (NFC) scheme, an infrared communication scheme, or the like.

In such a way, the mobile terminal 60 is configured.

Figure 4A:
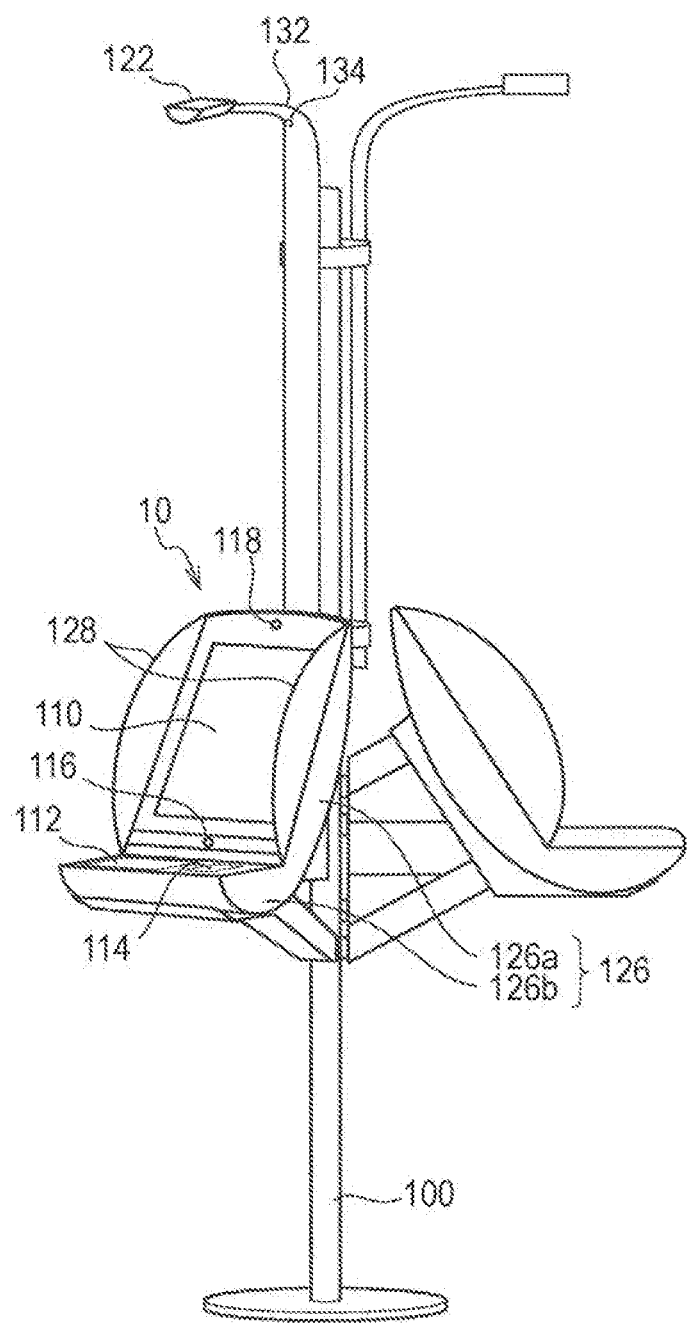
FIG. 4A is a schematic diagram illustrating the external appearance of the kiosk terminal according to one example embodiment of the present invention.
Figure 5:
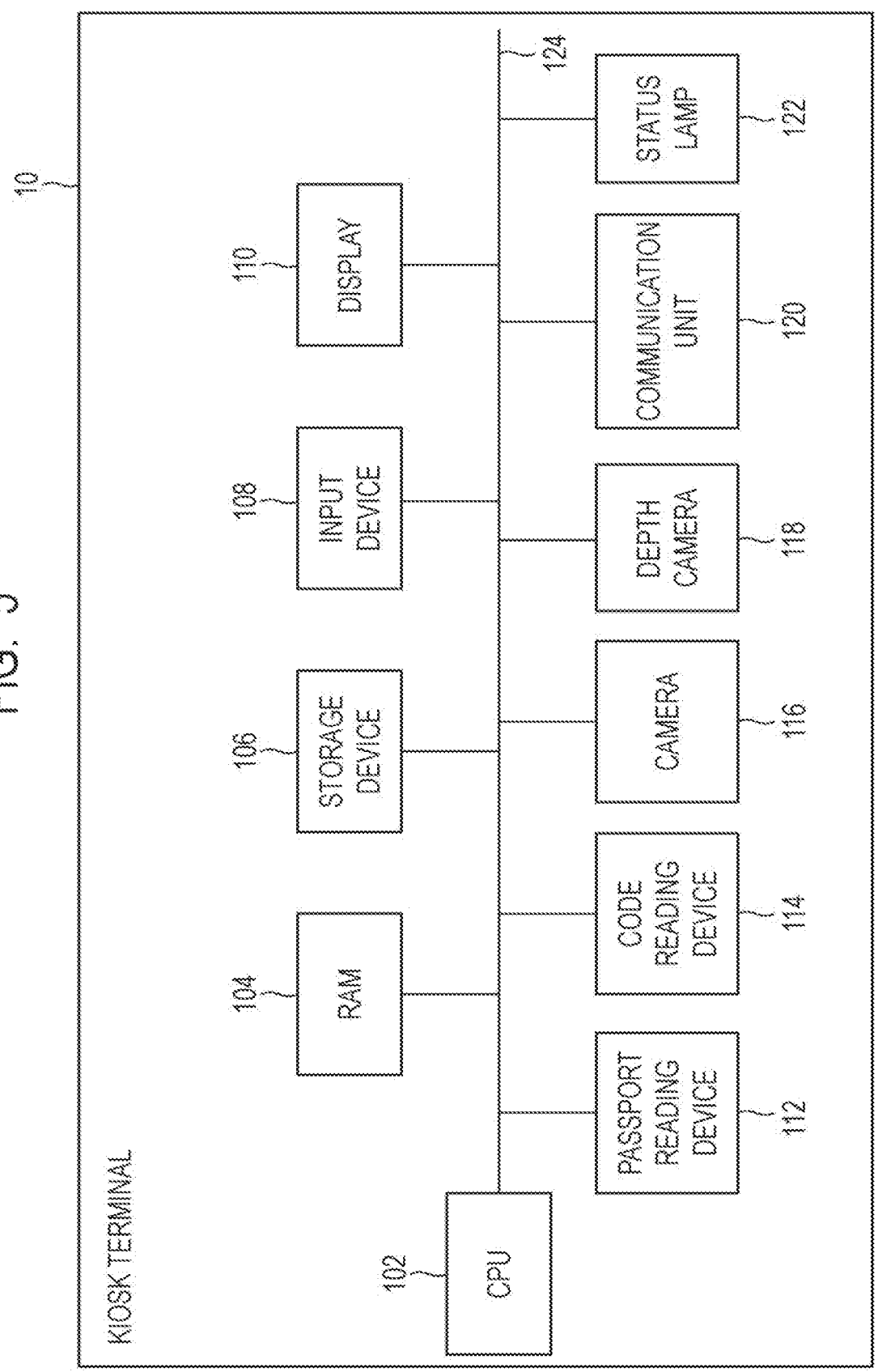
FIG. 5 is a block diagram illustrating one example of a hardware configuration of the kiosk terminal according to one example embodiment of the present invention.
Figure 6A:
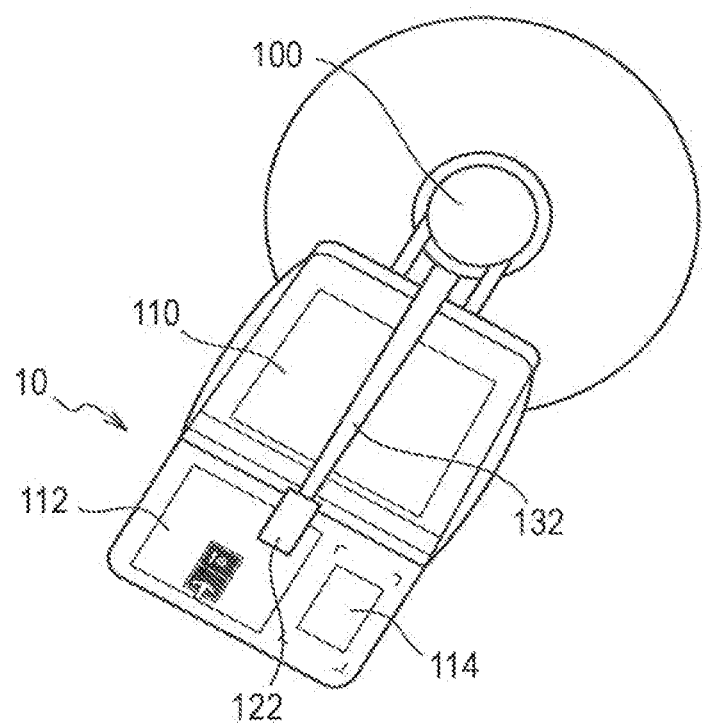
FIG. 6A is a schematic diagram illustrating a configuration when a single kiosk terminal according to one example embodiment of the present invention is installed.
Figure 6B:
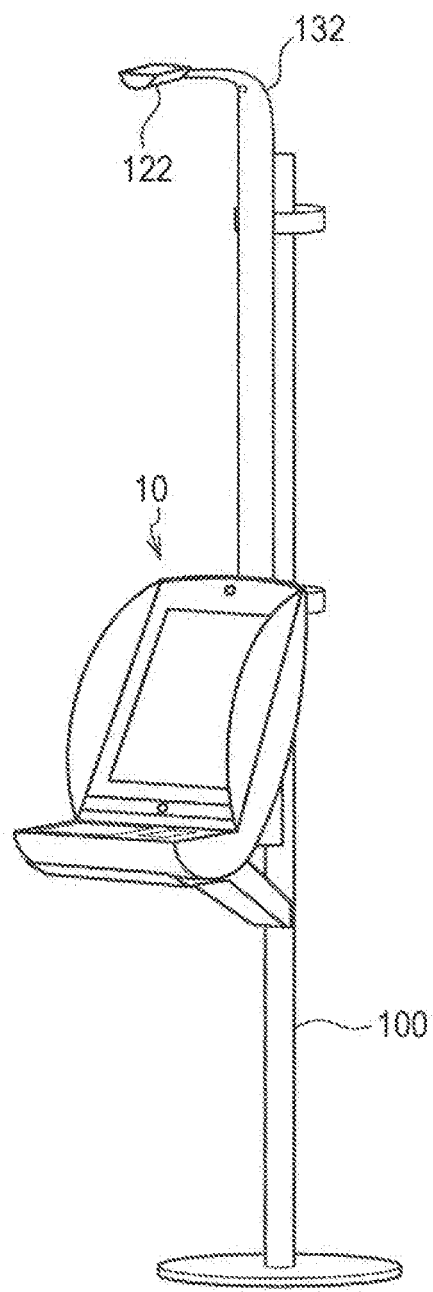
FIG. 6B is a schematic diagram illustrating a configuration when a single kiosk terminal according to one example embodiment of the present invention is installed.
Figure 7A:
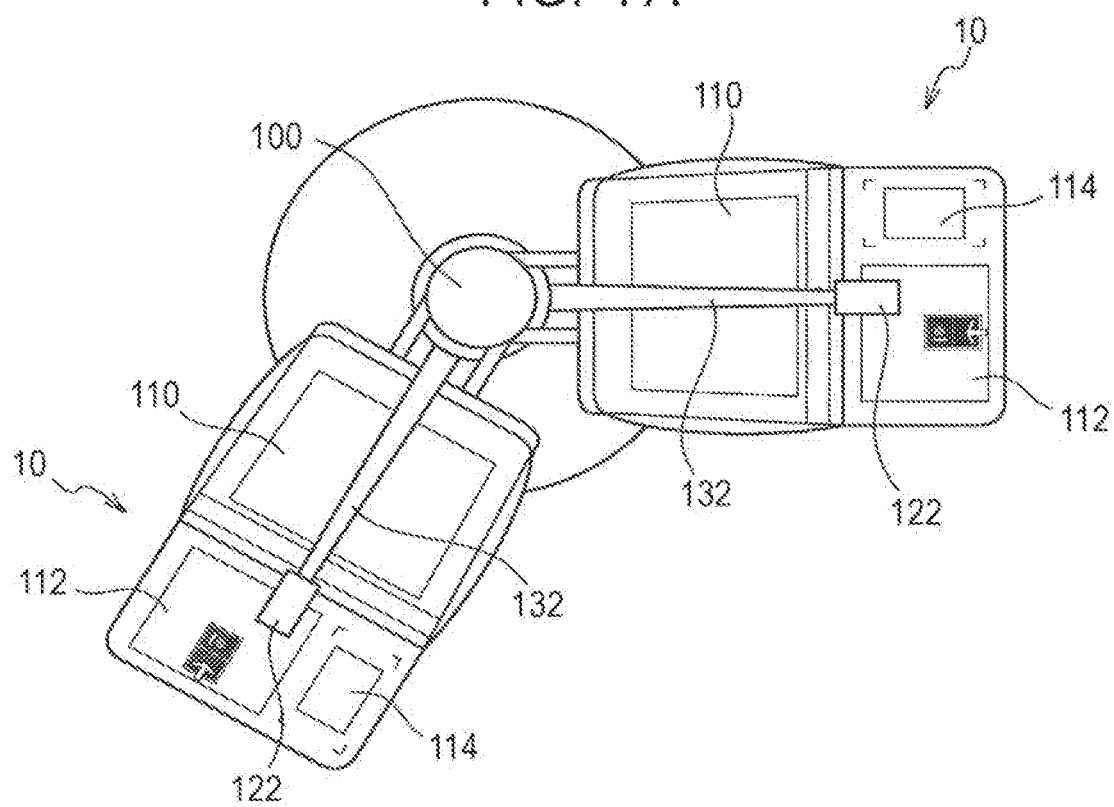
FIG. 7A is a schematic diagram illustrating a configuration when two kiosk terminals according to one example embodiment of the present invention are installed.
Figure 7B:
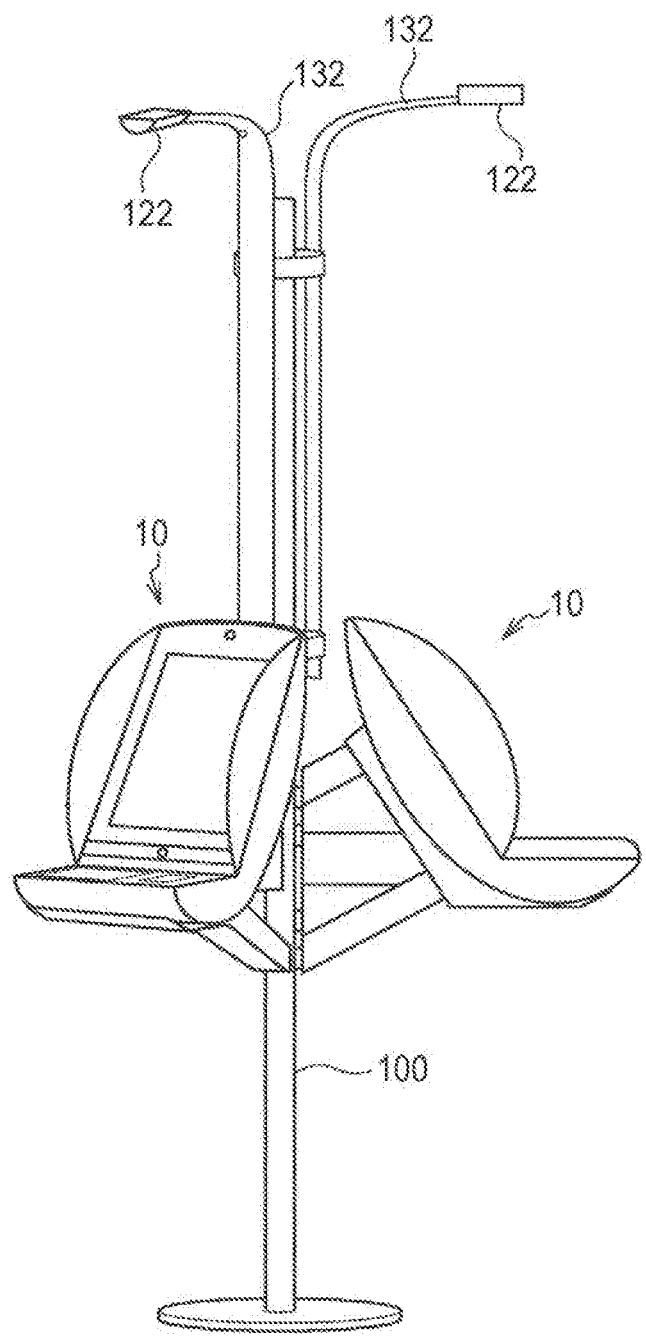
FIG. 7B is a schematic diagram illustrating a configuration when two kiosk terminals according to one example embodiment of the present invention are installed.
Figure 8A:
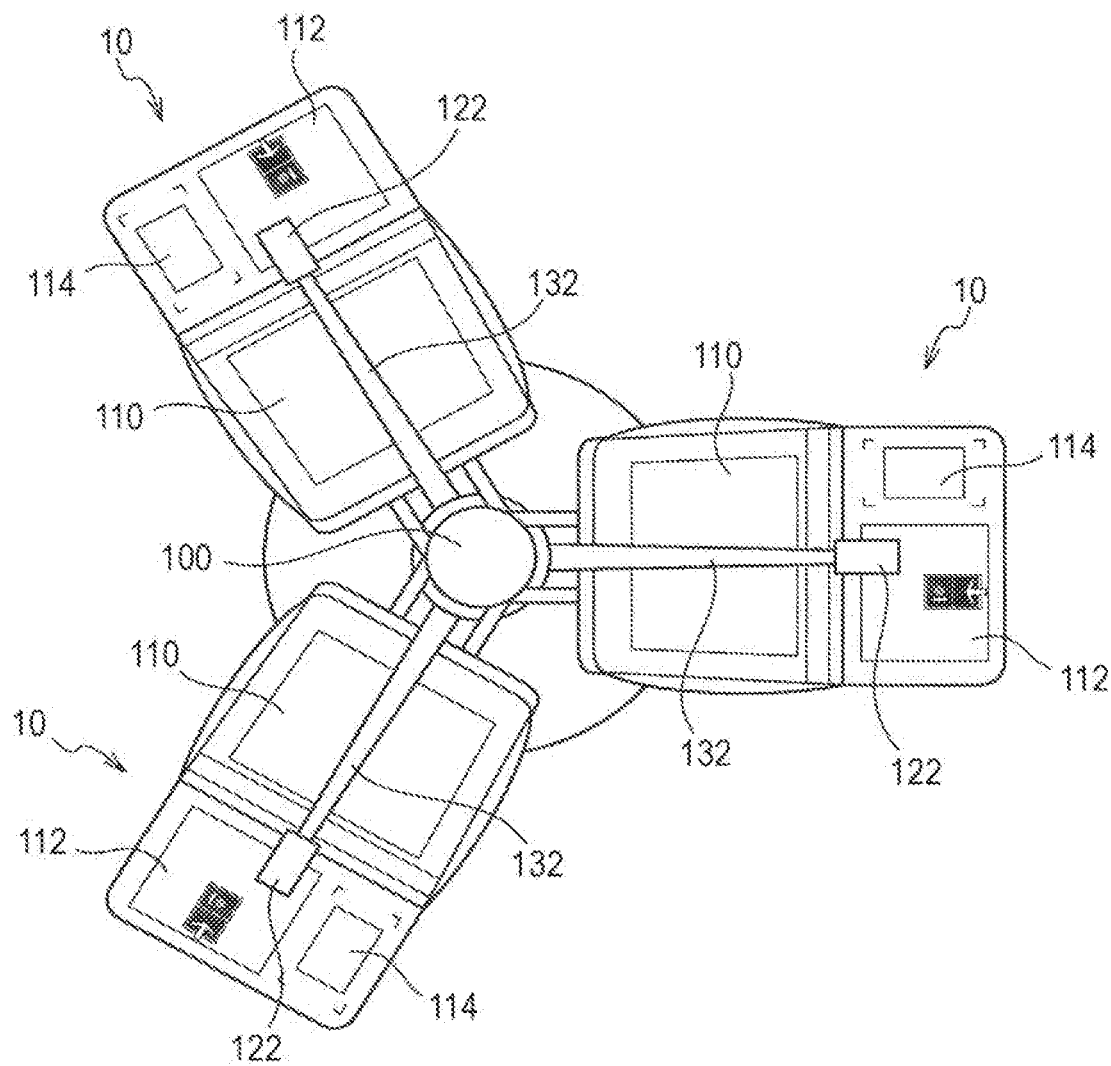
FIG. 8A is a schematic diagram illustrating a configuration when three kiosk terminals according to one example embodiment of the present invention are installed.
Figure 8B:
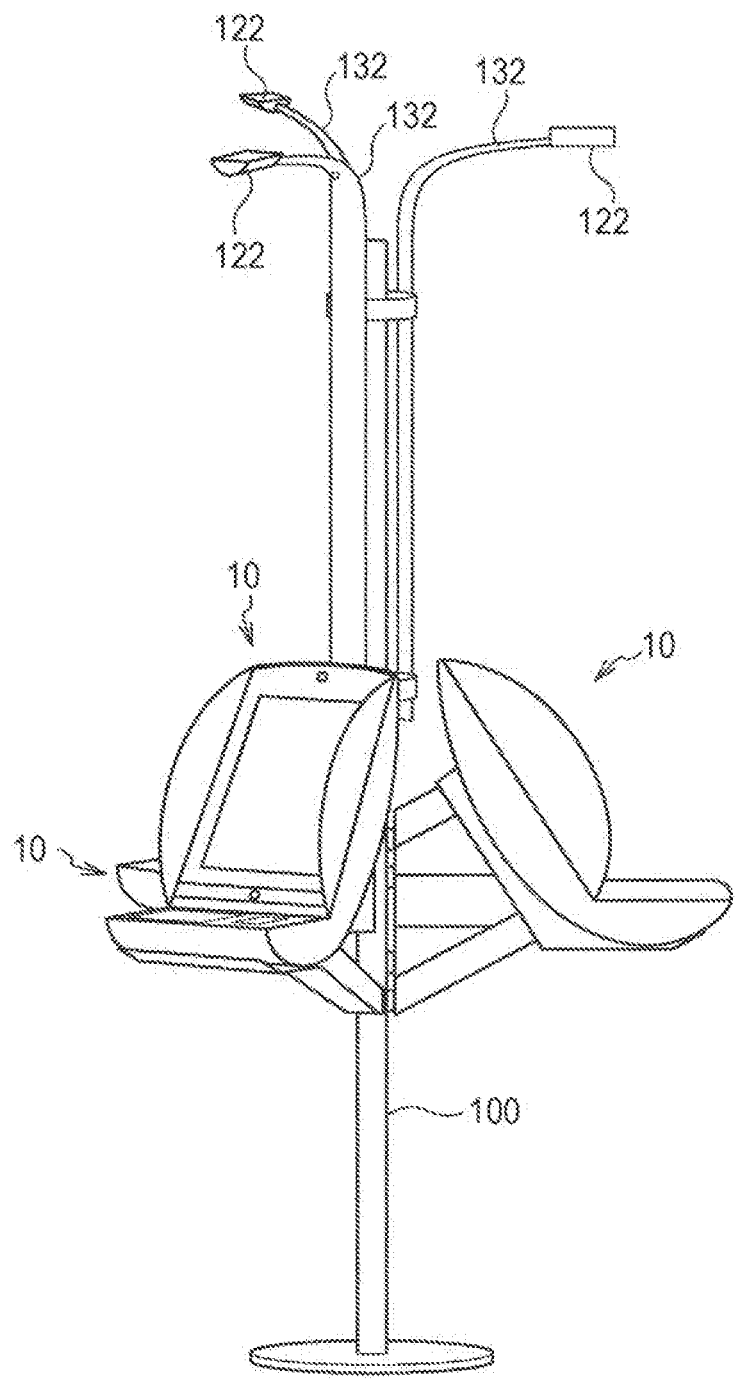
FIG. 8B is a schematic diagram illustrating a configuration when three kiosk terminals according to one example embodiment of the present invention are installed.
Figure 9:
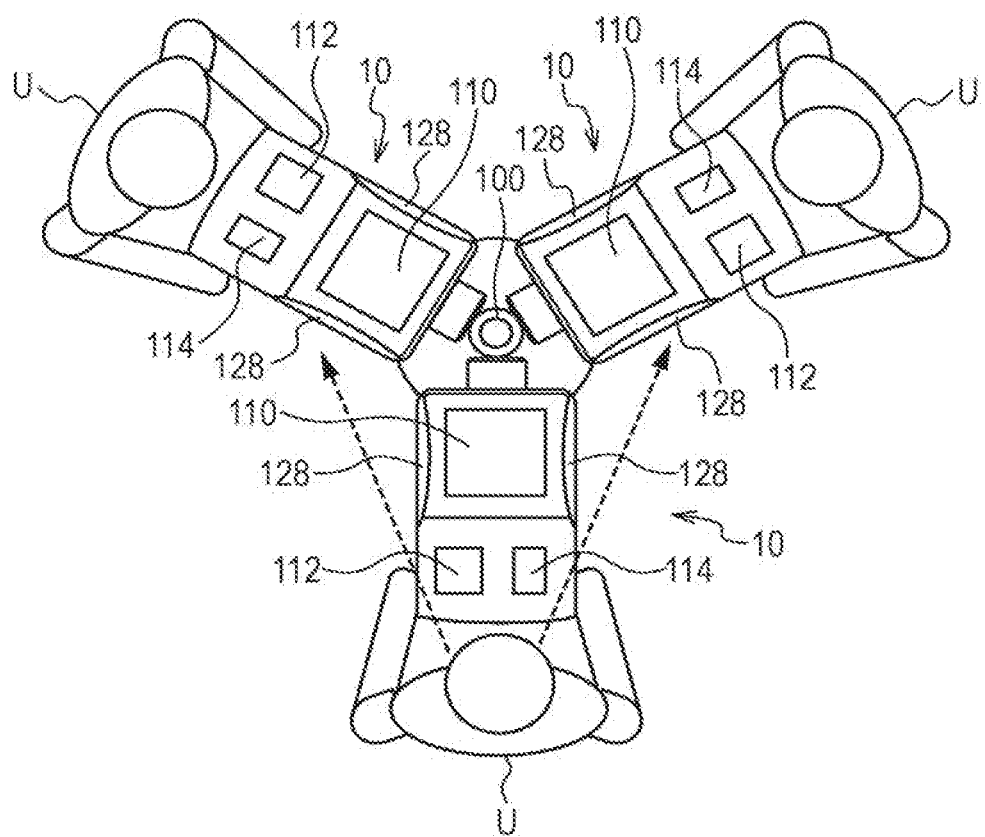
FIG. 9 is a schematic diagram illustrating prevention of peeping in the kiosk terminal according to one example embodiment of the present invention.
Figure 10:
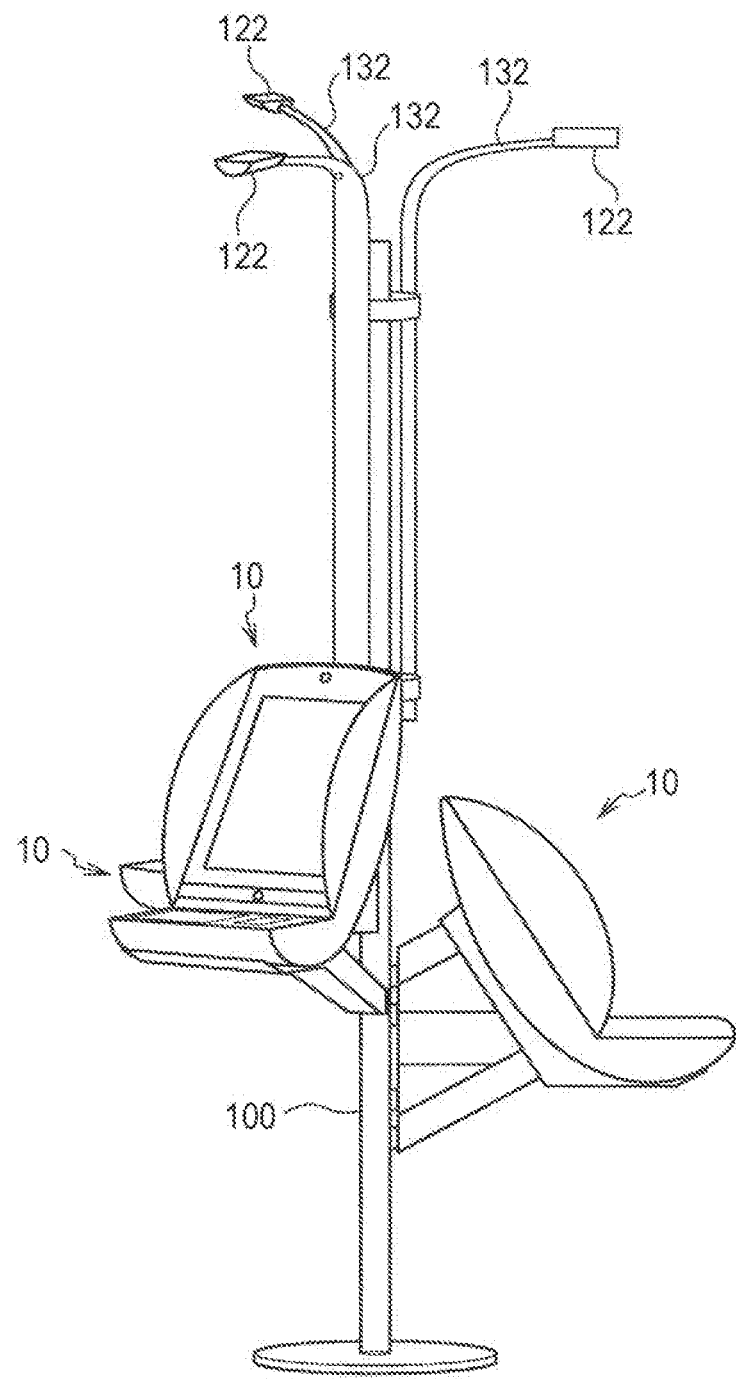
FIG. 10 is a schematic diagram illustrating a configuration when the kiosk terminals according to one example embodiment of the present invention are installed at different heights.

Next, the configuration of the kiosk terminal 10 will be described by using FIG. 4A to FIG. 10. FIG. 4A and FIG. 4B are schematic diagrams illustrating the external appearance of the kiosk terminal 10. FIG. 4A is a perspective view illustrating the entire kiosk terminal 10 installed on a pole 100, and FIG. 4B is an enlarged perspective view of the kiosk terminal 10 installed on the pole 100. FIG. 5 is a block diagram illustrating one example of the hardware configuration of the kiosk terminal 10. FIG. 6A and FIG. 6B are schematic diagrams illustrating the configuration when one kiosk terminal 10 is installed. FIG. 7A and FIG. 7B are schematic diagrams illustrating the configuration when two kiosk terminals 10 are installed. FIG. 8A and FIG. 8B are schematic diagrams illustrating the configuration when three kiosk terminals 10 are installed. FIG. 9 is a schematic diagram illustrating prevention of peeping in the kiosk terminal 10. FIG. 10 is a schematic diagram illustrating a configuration when the kiosk terminals 10 are installed at different heights.

The kiosk terminal 10 is an information processing apparatus that accepts customs declaration by a declaration code displayed on the mobile terminal 60 of the user U and guides the user U to the electronic gate 20 or the manned booth M in accordance with the detail of the customs declaration. As illustrated in FIG. 4A and FIG. 4B, the kiosk terminal 10 is attached and installed to the side of the pole 100 that is a support member installed with the longitudinal direction being perpendicular. Note that one or a plurality of kiosk terminals 10 may be installed to one pole 100 as described later.

Further, as illustrated in FIG. 5, the kiosk terminal 10 has a CPU 102, a RAM 104, a storage device 106, an input device 108, and a display 110. Furthermore, the kiosk terminal 10 has a passport reading device 112, a code reading device 114, a camera 116, a depth camera 118, a communication unit 120, and a status lamp 122. The CPU 102, the RAM 104, the storage device 106, and input device 108, the display 110, the passport reading device 112, the code reading device 114, the camera 116, the depth camera 118, the communication unit 120, and the status lamp 122 are connected to a bus line 124.

As illustrated in FIG. 4A and FIG. 4B, the kiosk terminal 10 has a casing 126 attached to the pole 100. The casing 126 has a first casing portion 126a on which the display 110 and the camera 116 are provided and a second casing portion 126b on which the passport reading device 112 and the code reading device 114 are provided. Note that the CPU 102, the RAM 104, the storage device 106, and the communication unit 120 are accommodated inside the casing 126.

The first casing portion 126a has a display face on which the display 110 is provided. The second casing portion 126b has a reading face on which the passport reading device 112 and the code reading device 114 are provided. The second casing portion 126b is integrally coupled to the lower part of the first casing portion 126a such that the display face and the reading face form an obtuse angle relative to each other. The first casing portion 126a and the second casing portion 126b are configured such that, when the kiosk terminal 10 is installed on the pole 100, the display face of the first casing portion 126a faces the forward diagonally upward direction, which is opposite to the rearward direction on the pole 100 side, and the reading face of the second casing portion 126b is substantially horizontal.

The kiosk terminal 10 is installed on the pole 100 so as to be located at a height by which the user U having a height above a predetermined height looks down at the display 110 and both the passport reading device 112 and the code reading device 114, for example.

The display 110 is provided on the display face of the first casing portion 126a such that the screen thereof faces the forward diagonally upward direction. The input device 108 as a touchscreen is embedded in the display 110.

Further, the camera 116 is provided at the center of a part between the display 110 and the second casing portion 126b, which is a lower part of the display face of the first casing portion 126a. The camera 116 is provided between the display 110, which is a display unit provided on the first casing portion 126a, and the passport reading device 112 and the code reading device 114, which are an information acquisition unit provided on the second casing portion 126b. Note that, while the single camera 116 is provided, two cameras 116 may be provided in the upper part and the lower part interposing the display 110. In such a case, the camera 116 on the lower side is provided at the center of a part between the display 110 and the second casing portion 126b, which is a lower part in the display face of the first casing portion 126a, as described above, for example. On the other hand, the camera 116 on the upper side is provided at the center of an upper side of the display 110 in an upper part of the display face of the first casing portion 126a, for example.

The camera 116 is provided such that the capturing direction faces the forward diagonally upward direction. The user U in front of the kiosk terminal 10 will direct his/her eyes in the forward diagonally downward direction and look down at the display 110, the passport reading device 112, or the code reading device 114 to operate the kiosk terminal 10. The camera 116 has a view angle so as to be able to capture the face of the user U looking down at the display 110, the passport reading device 112, or the code reading device 114 to operate the kiosk terminal 10 as discussed above.

Further, the depth camera 118 is provided at the center of an upper part of the display face of the first casing portion 126a. The depth camera 118 is provided so as to be able to acquire three-dimensional information of an object captured by the camera 116. Note that the depth camera 118 may be provided to be arranged adjacent to one or two cameras 116 provided as described above.

Further, plate-shape visors 128 are provided along the display 110 on the both sides of the display face of the first casing portion 126a so as to protrude from the display face, respectively. Each of the visors 128 functions as a shielding unit that blocks a glance directed to the display 110 from the side direction of the kiosk terminal 10, from the diagonally backward direction or from the diagonally forward direction and makes it difficult for a person other than the user U using the kiosk terminal 10 to peep the display 110.

Further, lighting members 130 that are lighting units for irradiating the face of the user U operating the kiosk terminal 10 are provided on the both sides of the display face of the first casing portion 126a, respectively. For example, each of the lighting members 130 may be formed of a light source such as a light source that emits light from the lower part to the upper part along the display 110 or a bar-shape light source provided along the display 110. As a light source, although not limited in particular, a light emitting diode (LED) or the like can be used. With the lighting members 130 provided on both sides of the display 110, sufficient brightness can be maintained when the face of the user U operating the kiosk terminal 10 is captured by the camera 116. Note that the lighting members 130 may be always turned on during the operation of the kiosk terminal 10. Further, the lighting members 130 are not necessarily required to be always turned on during the operation of the kiosk terminal 10 and may be configured to be turned on when the face of the user U is captured by the camera 116. In such a case, the lighting members 130 can be configured to be turned on in response to the passport being read by the passport reading device 112 or the declaration code being read by the code reading device 114, for example. Further, the lighting members 130 may be configured to be turned on in response to the user U being detected by a human detection sensor (not illustrated) provided on the kiosk terminal 10, for example. Further, the lighting members 130 turned on at such a predetermined timing may be configured to be turned off after the capturing of the face of the user U by the camera 116 has finished or after a predetermined time has elapsed, for example.

The passport reading device 112 is provided on the left side, and the code reading device 114 is provided on the right side with respect to the display 110 on the reading face of the second casing portion 126b. In other kiosk terminals installed in an airport or the like, a reading device that reads a code such as a QR code is provided on the right side with respect to the terminal in general. Also in the kiosk terminal 10, with the code reading device 114 being provided on the right side with respect to the display 110, the user U is able to smoothly hold a declaration code displayed on the mobile terminal 60 over the code reading device 114 to cause the code reading device 114 to read the declaration code.

The passport reading device 112 is provided such that a reading unit that reads a passport is directed upward, for example, and is configured to have a slot into which the passport is inserted above the reading unit thereof. In such a case, the user U is able to cause the passport reading device 112 to read a passport by inserting the passport into the slot with the identity related page opened and the page facing down and holding it over the reading unit of the passport reading device 112. In a system in which a passport is inserted into a slot, once a passport is inserted into a slot, the user U is not required to continue to press the passport in order to keep the page opened and is able to accurately position the passport to the reading unit of the passport reading device 112. This can realize smooth reading of a passport.

Note that the configuration of the passport reading device 112 is not limited to the above configuration, and various configurations may be employed. For example, the passport reading device 112 may be configured such that the user U presses the passport on the reading unit with the identity related page opened. In such a case, the user U can cause the passport reading device 112 to read the passport by placing the passport facing down with the identity related page opened and pressing and holding the passport over the reading unit of the passport reading device 112.

Further, the code reading device 114 is also provided with the reading unit that reads a declaration code facing upward, for example. In such a case, the user U can cause the code reading device 114 to read a declaration code by holding the display 610 of the mobile terminal 60, on which a declaration code is displayed, over the reading unit of the code reading device 114 with the display 610 facing down.

Note that the configuration of the code reading device 114 is also not limited to the configuration described above, and various configurations may be employed. For example, the code reading device 114 may be configured such that the reading unit thereof reads a declaration code from the upper side. In such a case, the user U can cause the code reading device 114 to read a declaration code by holding the display 610 of the mobile terminal 60, on which a declaration code is displayed under the reading unit of the code reading device 114 with the display 610 facing up.

The status lamp 122 is provided on the upper part of the pole 100 so as to be located above the first casing portion 126a including the display 110. The status lamp 122 is provided on the tip of an arm 132 attached on the upper part of the pole 100 such that the status lamp 122 is located corresponding to the upper part of the kiosk terminal 10 that indicates a status. The arm 132 projects on the upper side of the kiosk terminal 10 from the pole 100.

Further, a surveillance camera 134 that monitors the status of the kiosk terminal 10 is provided on the arm 132. More specifically, the surveillance camera 134 that functions as a monitoring unit captures and monitors the view of the kiosk terminal 10 and the periphery thereof, the view of the user U who operates the kiosk terminal 10, or the like. The surveillance camera 134 is connected to the corresponding kiosk terminal 10 or the network NW. The surveillance camera 134 can transmit a video in which the view of the user U is captured to the management server 50 via the network NW via or without via the kiosk terminal 10.

The CPU 102 functions as a control unit that operates by executing a program stored in the storage device 106 and controls the operation of the entire kiosk terminal 10. Further, the CPU 102 executes an application program stored in the storage device 106 to perform various processes as the kiosk terminal 10. The RAM 104 provides a memory field necessary for the operation of the CPU 102.

More specifically, the CPU 102 functions as a comparison request unit that requests the management server 50 to perform face recognition of the user U who uses the kiosk terminal 10 to perform customs declaration. The CPU 102 as the comparison request unit requests a comparison between a captured face image of the user U and a passport face image of the user U as face recognition of the user U. The captured face image is a face image of the user U captured by the camera 116 during the use of the kiosk terminal 10. A passport face image is a face image acquired from the passport of the user U by the passport reading device 112. To request comparison, the CPU 102 transmits a captured face image and a passport face image or a face feature amount extracted therefrom to the management server 50 together with a comparison request. Once the CPU 102 reads at least one of a passport and a declaration code and acquires a captured face image of the user U and, on the other hand, reads the other of the passport and the declaration code the CPU 102, the CPU 102 can request the management server 50 for face recognition of the user U. Note that the timing when the CPU 102 acquires a captured face image and the timing when the CPU 102 requests face recognition are not limited to the above, and various variations are possible, respectively.

The CPU 102 can perform wearing item estimation in a captured face image during capturing by the camera 116. The CPU 102 can detect a wearing item on a face, such as a mask, sunglasses, glasses, a hat, or the like in a captured face image by performing wearing item estimation. When a wearing item on a face, which is a wearing item worn by the face of the user U, is detected, the CPU 102 may warn the user U to put off the wearing item on the face which may prevent a face recognition. For example, the CPU 102 may perform warning by displaying display on the display 110 that instructs the user U to put off the wearing item on the face or by outputting a voice from a speaker or the like that instructs the user U to put off the wearing item on the face.

Further, the CPU 102 functions as a comparison information acquisition unit that receives and acquires, from the management server 50, comparison information that is information indicating a result of the face recognition requested from the management server 50. Comparison information indicates that a passport face image and a captured face image are matched and identity verification of the user U performing customs declaration on the kiosk terminal 10 succeeded as a result of the face recognition or that a passport face image and a captured face image are not matched and identity verification of the user U performing customs declaration on the kiosk terminal 10 failed. Note that a case where a passport face image and a captured face image are matched includes a case where a comparison score indicating the similarity between both face images exceeds a predetermined threshold and both the face images have a high similarity.

Note that the CPU 102 can function as a comparison unit that compares a passport face image with a captured face image to acquire comparison information as face recognition of the user U instead of functioning as the comparison request unit and the comparison information acquisition unit. In a comparison between a passport face image and a captured face image, the CPU 102 can compare a face feature amount extracted from the passport face image with a face feature amount extracted from the captured face image and thereby compare both the face images.

Further, the CPU 102 functions as a user information transmission unit that transmits user information on the user U to the management server 50. The user information on the user U includes identity related information, face information, and declaration information on the user U associated with each other.

Identity related information includes information on the individual user U, such as, the name, the birthday, or the like of the user U. Further, identity related information includes information on the passport of the user U, such as the passport number of the user U, the term of validity of the passport, or the like. The identity related information is acquired from a passport of the user U by the passport reading device 112.

Face information corresponds to a captured face image and a passport face image of the user U. Further, face information may not be a captured face image itself and a passport face image itself and may be face feature amounts extracted from a captured face image and a passport face image, respectively. In such a case, the CPU 102 extracts face feature amounts from a captured face image and a passport face image, respectively.

Declaration information includes information to be declared in customs declaration when the user U enters a country. The declaration information is information acquired from a declaration code displayed on the mobile terminal 60 of the user U by using the code reading device 114. As described above, declaration information includes information necessary for customs declaration such as the name of the user U, the current address or the stay address in the country that the user U enters, the occupation, the birthday, the passport number, the flight number, the origin, the date of entry, details to be declared in customs declaration, or the like, for example.

Note that user information on the user U transmitted to the management server 50 is registered to a user information database (DB) 506a in the management server 50, as described later. A captured face image or a passport face image included in user information is registered in the user information DB 506a as a registered face image, which is registered biometrics information registered in advance.

Further, the CPU 102 functions as a determination request unit that requests the management server 50 to determine the declaration detail included in declaration information on the user U who performs customs declaration by using the kiosk terminal 10. The CPU 102 as the determination request unit requests determination of the declaration detail included in declaration information transmitted to the management server 50. The CPU 102 receives, from the management server 50, determination information that is information indicating a result of determination of the declaration detail included in declaration information.

Further, the CPU 102 functions as a determination information acquisition unit that receives and acquires, from the management server 50, determination information that is information indicating a result of determination of the declaration detail requested from the management server 50. Determination information indicates whether or not the user U is taxable or whether or not there is a risk in the user U, as a result of determination. A case where the user U is taxable is a case where the declaration detail includes declaration stating that the user U has items exceeding the duty-free allowance, a case where the declaration detail includes declaration stating that the user U has commercial goods or samples, or the like, for example. A case where there is a risk in the user U is a case where the declaration detail includes declaration stating that the user U has an item that is prohibited or restricted to bring into that country, a case where the declaration detail includes declaration stating that the user U has an item requested from someone else to bring, or the like, for example.

Note that the CPU 102 can function as a determination unit that determines the declaration detail included in declaration information of the user U instead of functioning as the determination request unit and the determination information acquisition unit. In such a case, the CPU 102 can determine the declaration detail included in declaration information in the same manner as the management server 50.

Further, the CPU 102 functions as the determination unit that determines whether or not the electronic gate 20 is allowed to be used for the user U based on comparison information and determination information received from the management server 50. The CPU 102 as the determination unit determines that the user U is allowed to use the electronic gate 20 when the passport face image and the captured face image of the user U are matched, the user U is not taxable, and there is no risk in the user U. On the other hand, the CPU 102 determines that the user U is not allowed to use the electronic gate 20 when the passport face image and the captured face image of the user U are not matched, the user U is taxable, or there is a risk in the user U.

Further, the CPU 102 can transmit, to the management server 50, gate availability information that is information indicating a determination result of the availability of the electronic gate 20. In such a case, gate availability information transmitted to the management server 50 is registered to the user information DB 506a in the management server 50 in association with user information, as described later. When the passport face image and the captured face image of the user U are matched, the user U is not taxable, and there is no risk in the user U, the gate availability information indicates that the user U is allowed to use the electronic gate 20.

Further, the CPU 102 functions as a display control unit that causes the display 110 to display a window such as guide, notification, or the like to the user U who performs customs declaration on the kiosk terminal 10. For example, the CPU 102 as the display control unit causes the display 110 to display a guide window showing how to use the kiosk terminal 10. Further, the CPU 102 causes the display 110 to display a declaration detail confirmation window on which the user U confirms and, if necessary, modifies the declaration detail included in declaration information acquired from the mobile terminal 60 of the user U.

Further, the CPU 102 functions as a processing unit that performs a process on the user U who has performed customs declaration on the kiosk terminal 10 in accordance with a determination result of the availability of the electronic gate 20. More specifically, the CPU 102 causes the display 110 to display a guide window that guides the user U to the electronic gate 20 or the manned booth M and guides the user U to the electronic gate 20 or the manned booth M in accordance with a determination result of the availability of the electronic gate 20.

Further, the CPU 102 functions as a language setting unit that sets a use language on the kiosk terminal 10 based on language information read from a declaration code displayed on the mobile terminal 60 of the user U who performs customs declaration on the kiosk terminal 10. Further, when a change entry to change a use language on the kiosk terminal 10 to another language is input from the user U via the input device 108, the CPU 102 changes the use language in accordance with the change entry. Note that the use language on the kiosk terminal 10 is a language in which various information is displayed on the display 110 and input from the input device 108 is accepted, for example. The kiosk terminal 10 supports multiple languages such as the Japanese language, the English language, the Chinese language, the Korean language, or the like, for example, as with the customs declaration application of the mobile terminal 60. Thereby, the kiosk terminal 10 can display and entry in a use language set from a plurality of languages.

The storage device 106 is formed of a storage medium such as a non-volatile memory, a hard disk drive, or the like and functions as a storage unit. The storage device 106 stores a program executed by the CPU 102, data referenced by the CPU 102 in execution of the program, or the like.

The input device 108 is a touchscreen embedded in the display 110, for example. The input device 108 functions as an input unit that accepts entry of an instruction from the user U. The user U may enter various information or enter an instruction of execution of a process to the kiosk terminal 10 via the input device 108.

The display 110 functions as a display unit that displays various windows to the user U who uses the kiosk terminal 10. For example, the display 110 displays a guide window showing how to use the kiosk terminal 10, a declaration detail confirmation window to the user U, a guide window to the user U, or the like. Further, the display 110 may display comparison information indicating a result of comparison between a captured face image and a passport face image and determination information indicating a result of determination of the declaration detail.

The display 110 may be installed so as to be vertically long, for example. With the vertically long display 110, it is possible to realize installation of the kiosk terminal 10 in a narrow space while realizing display of the same amount of information as that of a horizontally long display of the same size. Furthermore, with the vertically long display 110, it is possible to prevent, by the body of the user U standing in front of the display 110, peeping of the display 110 from behind.

The passport reading device 112 functions as a reading unit that reads a passport of the user U and acquires information recorded in the passport. The passport reading device 112 is formed of an image scanner, a contactless integrated circuit (IC) reader, an optical character reader (OCR) device, or the like, for example. The passport reading device 112 reads a passport that is a medium held over the reading unit thereof and acquires information from the passport.

For example, the passport reading device 112 reads and acquires identity related information on the user U indicated on the sheet of the passport by using an OCR device. Further, for example, the passport reading device 112 reads and acquires a passport face image of the user U indicated on the sheet of the passport by using an image scanner. Further, in the case of an IC passport, the passport reading device 112 reads and acquires identity related information on the user U, a passport face image, or the like stored in the IC chip of the IC passport by using a contactless IC reader. Note that biometrics information on the user U recorded and included in a passport is not limited to a face image and may be other biometrics information such as an iris image. The passport reading device 112 may acquire biometrics information on the user U included in the passport.

The code reading device 114 functions as a reading unit that reads a declaration code displayed on the mobile terminal 60 of the user U and acquires declaration information and language information included in the declaration code. For example, the code reading device 114 is a code reader in accordance with the type of a declaration code to be read, such as a QR code reader, a barcode reader, or the like. The code reading device 114 reads a declaration code displayed on the mobile terminal 60 that is a code display medium held over the reading unit thereof and acquires information from the declaration code.

The camera 116 functions as a biometrics information acquisition unit that acquires a face image of the user U as biometrics information on the user U who performs customs declaration by using the kiosk terminal 10. For example, the camera 116 is a capturing apparatus such as a digital camera that captures a moving image or a static image of the face of the user U in front of the kiosk terminal 10 and acquires a captured face image that is a face image of the user U from the captured moving image or the captured static image. The camera 116 captures a face image of the user U who operates the passport reading device 112 to read a passport or operates the code reading device 114 to read a declaration code in front of the kiosk terminal 10 and thereby acquires a captured face image under the control of the CPU 102 as described later. In such a way, once at least one of a passport and a declaration code is read, the camera 116 can capture the face of the user U and acquire a captured face image. Note that, instead of the camera 116, a unit that acquires, from the user U, the same type of biometrics information as the biometrics information acquired from a passport by the passport reading device 112 may be provided as the biometrics information acquisition unit.

The CPU 102 can set the number of pixels between eyes in a captured face image captured by the camera 116 to a predetermined range. In such a case, out of the face images captured by the camera 116, the CPU 102 can exclude a face image in which the number of pixels between eyes is less than a predetermined number of pixels from the target captured face images, for example. Thereby, the camera 116 can reliably capture the user U who operates the kiosk terminal 10 without capturing a distant person behind the user U who operates the kiosk terminal 10.

Further, the CPU 102 can mask a predetermined range on both sides in the capturable range of the camera 116, respectively. Thereby, the camera 116 can reliably capture the user U who operates the kiosk terminal 10 while preventing inclusion of a person around the user U who operates the kiosk terminal 10.

Note that the kiosk terminal 10 may be configured such that a captured face image captured by the camera 116 is not displayed on the display 110 or the like. In such a case, the user U is unaware that his/her face is captured on the kiosk terminal 10. Thus, the user U can comfortably use the kiosk terminal 10 without a feeling of hesitation against being captured or without a mental pressure due to being captured.

The depth camera 118 acquires three-dimensional information on an object to be captured by the camera 116. The CPU 102 can determine, based on the three-dimensional information acquired by the depth camera 118, whether a captured face image of the user U captured by the camera 116 is an image acquired from an actual human or an image acquired from a two-dimensional image such as a photograph. This can prevent a fraud such as impersonation.

The communication unit 120 is connected to the network NW and transmits and receives data via the network NW. The communication unit 120 communicates with the management server 50 or the like under the control of the CPU 102.

The status lamp 122 functions as a status display unit that indicates the status of the kiosk terminal 10. More specifically, the status lamp 122 can indicates status such as the progress status of customs declaration of the user U on the kiosk terminal 10, the presence or absence of an anomaly of the kiosk terminal 10, the status of availability of the kiosk terminal 10, or the like, for example, as the status of the kiosk terminal 10 by using different lamp colors. The status lamp 122 can be turned on in a lamp color in accordance with the status of the kiosk terminal 10 under the control of the CPU 102. Note that a surveillance camera for detecting suspicious behavior may be provided between the status lamp 122 and the pole 100. This surveillance camera can be configured to start capturing once a passport is read by the passport reading device 112 or a declaration code is read by the code reading device 114, for example.

The status lamp 122 can be turned on in different lamp colors such as lighting in green, lighting in yellow, lighting in red, blinking in green, blinking in yellow, or blinking in red, for example, in accordance with the status. In such a case, each lamp color indicates the following status, for example. That is, lighting in green indicates a case where there is a matching in a face recognition and there is no problem in custom information. Lighting in yellow indicates a case where a face recognition failed. Lighting in red indicates a case where there is a problem in custom information. Blinking in green indicates a case where customs declaration status is late. Blinking in yellow indicates a case where there is a problem in a system including the kiosk terminal 10. Blinking in red indicates a case where an illegal passport is determined or a person included in a blacklist is determined by face recognition. Note that these are mere examples, and the combination of lamp colors and status may be other combinations. As discussed above, the status lamp 122 can be turned on in a different manner based on at least one of information read by the passport reading device 112 or the code reading device 114, a result of face recognition, and the status of procedures, for example. Further, the lighting members 130 described above provided on the sides of the display 110 may also be turned on in the same color as the status lamp 122. The lighting member 130 may be turned on in a different manner based on at least one of information read by the passport reading device 112 or the code reading device 114, a result of face recognition, and the status of procedures, for example, in the same manner as the status lamp 122. In such a case, the lighting members 130 may be provided on the upper face or the upper end of the visors 128, for example. While the screen content in the display 110 is hidden from the periphery by the visors 128, a person interested such as a staff who knows the relationship between the lamp color and the status such as an error can recognize the status of the kiosk terminal 10 in accordance with the lighting status of the status lamp 122 or the lighting members 130. This enables a person interested to attend properly, such as promptly attending to the situation where the status lamp 122 or the lighting members 130 blinks in red, for example.

In such a way, the kiosk terminal 10 is configured.

With respect to the kiosk terminal 10 configured as described above, the single kiosk terminal 10 may be installed on one pole 100, a plurality of kiosk terminals 10 may be installed on one pole 100. FIG. 6B is a perspective view illustrating the configuration when one kiosk terminal 10 is installed, and FIG. 6A is a top view of FIG. 6B. FIG. 7B is a perspective view illustrating the configuration when two kiosk terminals 10 are installed, and FIG. 7A is a top view of FIG. 7B. FIG. 8B is a perspective view illustrating the configuration when three kiosk terminals 10 are installed, and FIG. 8A is a top view of FIG. 8B.

In a case of configuration in which one kiosk terminal 10 is installed on one pole 100, the kiosk terminal 10 is installed on the side of the pole 100 facing a predetermined direction as illustrated in FIG. 6A and FIG. 6B.

Further, with a plurality of kiosk terminals 10 being installed on one pole 100, a kiosk terminal group that is an information processing apparatus group may be configured.

In a case of the configuration in which two kiosk terminals 10 are installed on one pole 100, the two kiosk terminals 10 are installed on the side of the pole 100 radially about the pole 100 with predetermined angle intervals, as illustrated in FIG. 7A and FIG. 7B. The angle interval between two adjacent kiosk terminals 10 is 120 degrees, for example. In such a way, the kiosk terminal group including the two kiosk terminals 10 is configured.

In a case of the configuration in which three kiosk terminals 10 are installed on one pole 100, the three kiosk terminals 10 are installed on the side of the pole 100 radially about the pole 100 with predetermined angle intervals, as illustrated in FIG. 8A and FIG. 8B. The angle interval between two adjacent kiosk terminals 10 of the three kiosk terminals 10 is equally 120 degrees, respectively, for example. In such a way, the kiosk terminal group including the three kiosk terminals 10 is configured.

In such a way, when a plurality of kiosk terminals 10 are installed, a larger spacing between respective users U who use the adjacent kiosk terminals 10 can be secured when the kiosk terminals 10 are installed radially about the pole 100 than when the kiosk terminals 10 are arranged laterally in a line and installed. This can make it difficult to peep the display 110 of the kiosk terminal 10 from the user U in front of the adjacent kiosk terminal 10.

Note that, when a plurality of kiosk terminals 10 are radially installed, the angle interval between two adjacent kiosk terminals 10 is not limited to 120 degrees described above and may be appropriately set. Further, the number of kiosk terminals 10 installed on one pole 100 is not limited to the number described above and may be four or greater.

Furthermore, the visors 128 are provided along the display 110 on both sides of the display 110 are provided to the kiosk terminal 10, respectively. In the kiosk terminal 10, the visors 128 also make it difficult to peep the display 110.

FIG. 9 illustrates blocking of a glance by using the visors 128 in the configuration in which three kiosk terminals 10 are installed as illustrated in FIG. 8A and FIG. 8B. As illustrated FIG. 9, a line of sight directed to the adjacent kiosk terminal 10 from the user U in front of the kiosk terminal 10 will be blocked by the visor 128 provided on the adjacent kiosk terminal 10, as illustrated by dashed-line arrows in FIG. 9. In such a way, the visor 128 also makes it difficult to peep the display 110.

Further, when a plurality of kiosk terminals 10 are installed on one pole 100, the plurality of kiosk terminals 10 may be installed at different heights. For example, as illustrated in FIG. 10, in the configuration in which three kiosk terminals 10 are installed, one of the kiosk terminals 10 may be installed at a position lower than the other two kiosk terminals 10. In such a way, with a plurality of kiosk terminals 10 being installed at different heights from each other, the users U of wide range of heights are able to use the kiosk terminal 10. Further, the user U who uses a wheelchair is able to use the kiosk terminal 10 installed at the position lower than the remaining kiosk terminals 10 while using the wheelchair, for example.

Note that the scheme to attach and fix the kiosk terminal 10 to the pole 100 is not particularly limited, and various schemes may be used. For example, the kiosk terminal 10 may be installed by being fixed to any of attachment positions in a plurality of stages of different heights provided on the pole 100 by screwing. Further, the kiosk terminal 10 may be installed on the pole 100 so as to be able to be slid vertically by the user U by himself/herself who uses the kiosk terminal 10, a customs officer who manages the kiosk terminal 10, or the like, for example. In such a case, the user U or the like may slide vertically the kiosk terminal 10 installed on the pole 100 to adjust the height of the kiosk terminal 10.

Further, cords or cables such as the power supply cord (not illustrated), the communication cable (not illustrated), or the like connected to the kiosk terminal 10 are accommodated inside the pole 100 and hidden. Further, the residual portion of the cords or the cables may be accommodated inside the casing 126 of the kiosk terminal 10.

Note that the kiosk terminal 10 may be installed on various support members such as a support stage, a counter, or the like other than the pole 100 described above.

Figure 11:
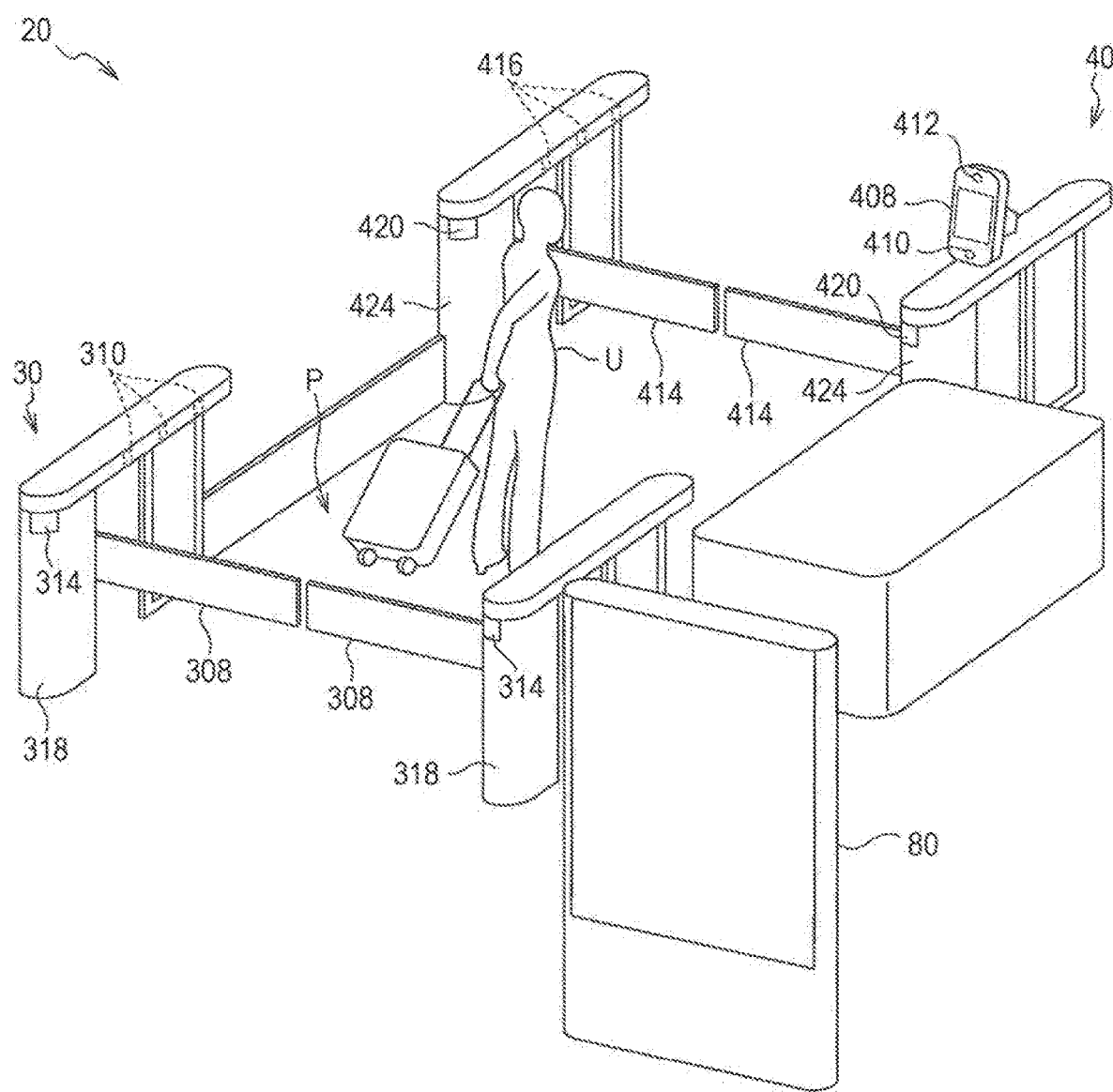
FIG. 11 is a schematic diagram illustrating the external appearance of an entrance gate terminal and an exit gate terminal forming the electronic gate according to one example embodiment of the present invention.
Figure 12:
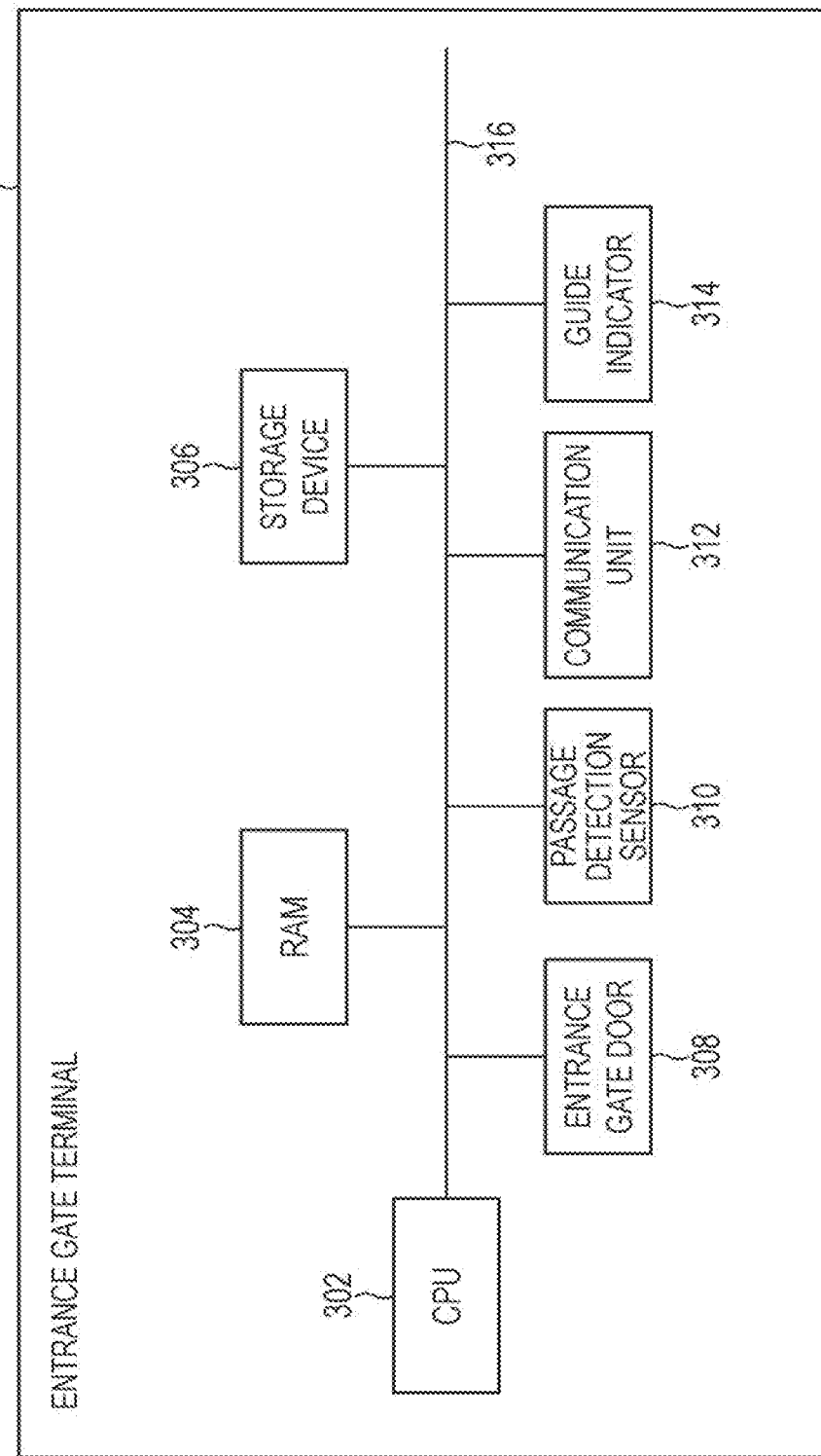
FIG. 12 is a block diagram illustrating one example of a hardware configuration of the entrance gate terminal forming the electronic gate according to one example embodiment of the present invention.
Figure 13:
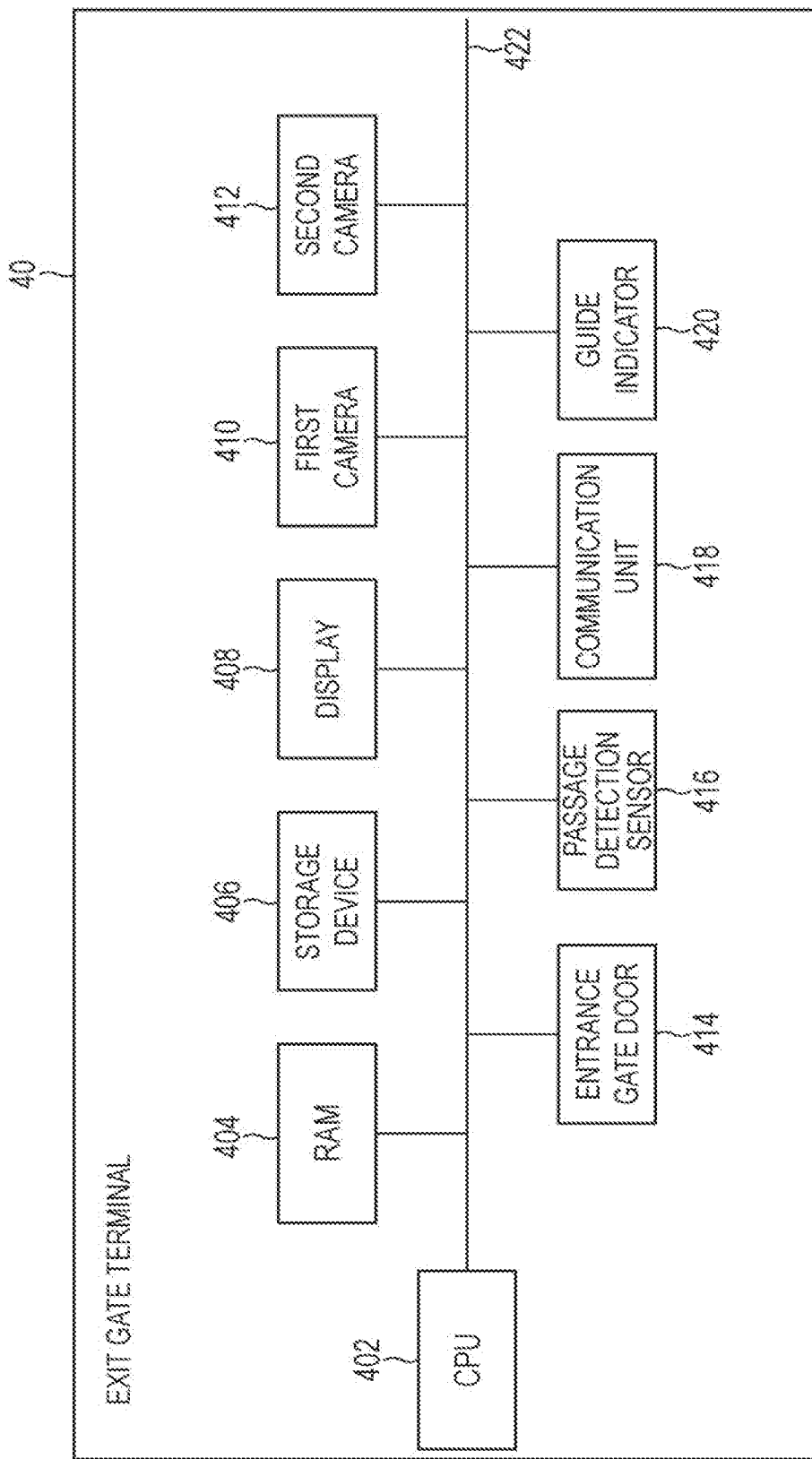
FIG. 13 is a block diagram illustrating one example of a hardware configuration of the exit gate terminal forming the electronic gate according to one example embodiment of the present invention.

Next, the configuration of the electronic gate 20 will be described by using FIG. 11 to FIG. 13. FIG. 11 is a schematic diagram illustrating the external appearance of the entrance gate terminal 30 and the exit gate terminal 40 forming the electronic gate 20. FIG. 12 is a block diagram illustrating one example of the hardware configuration of the entrance gate terminal 30. FIG. 13 is a block diagram illustrating one example of the hardware configuration of the exit gate terminal 40.

The electronic gate 20 is a gate apparatus that permits or refuses the passage of the user U guided to the electronic gate 20 by the kiosk terminal 10 based on a result of face recognition at the electronic gate 20 or the like. The user U who is permitted to pass through the electronic gate 20 can exit the customs inspection site C. The user U who is not permitted to pass through the electronic gate 20 will be subjected to a separate procedure, such as being guided to the manned booth M by a customs officer and subjected to face-to-face customs inspection by the customs officer, for example.

As illustrated in FIG. 11, the entrance gate terminal 30 and the exit gate terminal 40 forming the electronic gate 20 are installed at the entrance and the exit, respectively, on a gate passage P through which the user U guided to the electronic gate 20 who is allowed to use the electronic gate 20 has to pass. On the gate passage P, the user U who has entered the gate passage P is restricted to exit a passage other than the exit gate terminal 40 by a partition plate, a wall, a fence, an inspection stage, or the like installed on both sides along the gate passage P, for example.

First, the entrance gate terminal 30 will be described by using FIG. 11 and FIG. 12. As illustrated in FIG. 11, the entrance gate terminal 30 is a gate apparatus installed at the entrance of the gate passage P through which the user U who has been guided to the electronic gate 20 passes. As illustrated in FIG. 12, the entrance gate terminal 30 has a CPU 302, a RAM 304, a storage device 306, entrance gate doors 308, passage detection sensors 310, a communication unit 312, and guide indicators 314. The CPU 302, the RAM 304, the storage device 306, the entrance gate doors 308, the passage detection sensors 310, the communication unit 312, and the guide indicators 314 are connected to a bus line 316.

Further, as illustrated in FIG. 11, the entrance gate terminal 30 has a pair of casings 318 installed facing each other and interposing the entrance of the gate passage P. The entrance gate doors 308 that can close a space between the pair of casings 318 are provided to the pair of the casings 318. Further, a plurality of passage detection sensors 310 are provided to the pair of casings 318 so as to be aligned in the inward direction to the gate passage P. Further, the guide indicators 314 facing the front of the entrance gate terminal 30, namely, facing the outside of the gate passage P are provided to the pair of casings 318. The CPU 302, the RAM 304, the storage device 306, and the communication unit 312 may be accommodated in the casing 318 or may be accommodated in a casing separate from the casing 318.

The CPU 302 functions as a control unit that operates by executing a program stored in the storage device 306 and controls the operation of the entire entrance gate terminal 30. Further, the CPU 302 executes an application program stored in the storage device 306 to perform various processes as the entrance gate terminal 30. The RAM 304 provides a memory field necessary for the operation of the CPU 302.

More specifically, the CPU 302 functions as a determination unit that determines, based on output signals from the plurality of the passage detection sensors 310 and the output order thereof, whether or not the user U has passed through the entrance gate terminal 30 and entered the gate passage P.

Further, the CPU 302 functions as a door control unit that controls an opening operation and a closing operation of the entrance gate doors 308. When no user U has entered the gate passage P, the CPU 302 maintains the entrance gate doors 308 in an opened state. Further, once determining that the user U has passed through the entrance gate terminal 30 and entered the gate passage P based on the output signals from the passage detection sensors 310, the CPU 302 closes the entrance gate doors 308. Further, the CPU 302 maintains the entrance gate doors 308 in the opened state until it is determined that the user U who has entered the gate passage P has passed through the exit gate terminal 40 and exited the gate passage P. Further, the CPU 302 determines that the user U has exited the gate passage P in accordance with exit passage information transmitted from the exit gate terminal 40. In response to determining that the user U has exited the gate passage P, the CPU 302 opens the entrance gate doors 308.

Further, in response to determining that the user U has passed through the entrance gate terminal 30 and entered the gate passage P as described above, the CPU 302 transmits, to the exit gate terminal 40, entrance passage information indicating that the user U has passed through the entrance gate terminal 30 and entered the gate passage P.

Further, the CPU 302 functions as a display control unit that controls an indication on the guide indicators 314 in accordance with the open/close state of the entrance gate doors 308. When the entrance gate doors 308 are in an opened state, the CPU 302 causes the guide indicators 314 to display an indication indicating that entry to the gate passage P is permitted. Further, when the entrance gate doors 308 are in a closed state, the CPU 302 causes the guide indicators 314 to display an indication indicating that entry to the gate passage P is prohibited.

The storage device 306 is formed of a storage medium such as a non-volatile memory, a hard disk drive, or the like and functions as a storage unit. The storage device 306 stores a program executed by the CPU 302, data referenced by the CPU 302 in execution of the program, or the like.

The entrance gate doors 308 are closure doors that perform an opening operation and a closing operation under the control of the CPU 302 and transition between an opened state to permit passage of the user U and a closed state to block passage of the user U. The opening and closing scheme of the entrance gate doors 308 is not particularly limited and may be, for example, a flapper type, a slide type, a revolving type, or the like.

In response to detecting passage of the user U, each of the passage detection sensors 310 outputs an output signal indicating the passage of the user U. The CPU 302 can determine whether or not the user U has passed through the entrance gate terminal 30 and entered the gate passage P based on the output signals from the plurality of passage detection sensors 310, which are provided on the pair of casings 318 so as to be aligned in the inward direction to the gate passage P, and the output order of the output signals. The passage detection sensor 310 is not particularly limited and may be, for example, a transmission type photoelectric sensor, a reflection type photoelectric sensor, or the like. The transmission type photoelectric sensor has an emission unit that emits a light such as an infrared ray and a light receiving unit that receives the light emitted by the emission unit and outputs an output signal indicating passage of an object based on a change of the light received by the light receiving unit.

The communication unit 312 is connected to the network NW and transmits and receives data via the network NW. The communication unit 312 communicates with the exit gate terminal 40 or the like under the control of the CPU 302. Note that the communication unit 312 may be connected to the exit gate terminal 40 so as to be able to communicate with the exit gate terminal 40 without via the network NW.

The guide indictors 314 display an indication indicating whether to permit or refuse entry to the gate passage P under the control of the CPU 302. When the entrance gate doors 308 are in an opened state, the guide indicators 314 display an indication indicating that entry to the gate passage P is permitted. Further, when the entrance gate doors 308 are in a closed state, the guide indicators 314 display an indication indicating that entry to the gate passage P is prohibited. The guide indicators 314 can display an indication indicating whether to permit or refuse entry to the gate passage P by using a color indication, a symbol indication, a text indication, or the like, for example.

In such a way, the entrance gate terminal 30 is configured.

Next, the configuration of the exit gate terminal 40 will be described by using FIG. 11 and FIG. 13. As illustrated in FIG. 11, the exit gate terminal 40 is a gate apparatus installed at the exit of the gate passage P that is a passage through which the user U who has been guided to the electronic gate 20 passes. Further, as illustrated in FIG. 13, the exit gate terminal 40 has a CPU 402, a RAM 404, a storage device 406, and a display 408. Further, the exit gate terminal 40 has a first camera 410, a second camera 412, exit gate doors 414, passage detection sensors 416, a communication unit 418, and guide indicators 420. The CPU 402, the RAM 404, the storage device 406, the display 408, the first camera 410, the second camera 412, the exit gate doors 414, the passage detection sensors 416, the communication unit 418, and the guide indicators 420 are connected to a bus line 422.

Further, as illustrated in FIG. 11, the exit gate terminal 40 has a pair of casings 424 installed facing each other and interposing the exit of the gate passage P. The exit gate doors 414 that can close a space between the pair of casings 424 are provided to the pair of the casings 424. Further, a plurality of passage detection sensors 416 are provided to the pair of casings 424 so as to be aligned in the outward direction from the gate passage P. Further, the guide indicators 420 facing the front of the exit gate terminal 40, namely, facing the inside of the gate passage P are provided to the pair of casings 424. The CPU 402, the RAM 404, the storage device 406, and the communication unit 418 may be accommodated in the casing 424 or may be accommodated in a casing separate from the casing 424.

Further, the display 408 is installed on one of the pair of casings 424. The display 408 is installed such that the screen thereof faces the center of the gate passage P in front of the exit gate terminal 40, for example. The first camera 410 and the second camera 412 are provided on the lower part and the upper part on the screen side on the display 408, respectively. Note that the installation position of the display 408 is not particularly limited and may be a position where the user U on the gate passage P is able to look at the display 408.

The first camera 410 is a long-range camera that has a capturable range in at least the inside of the gate passage P between the entrance gate terminal 30 and the exit gate terminal 40 and can capture a more distant place than the second camera 412. The second camera 412 is a short-range camera that has a capturable range in at least a front area of the exit gate terminal 40. Note that the positions where the first camera 410 and the second camera 412 are provided are not particularly limited and may be any position that can realize respective capturable ranges.

The first camera 410 captures the user U who moves on the gate passage P from the entrance gate terminal 30 to the exit gate terminal 40 and acquires the face image as a first target face image. The second camera 412 captures the user U who moves on the gate passage P, reaches the exit gate terminal 40, and is located in front of the exit gate doors 414 to acquire the face image as a second target face image, if necessary. Capturing of the user U by the first camera 410 is performed without causing the user U to be aware thereof. On the other hand, capturing of the user U by the second camera 412 is performed on the user U who is notified by the display on the display 408 or the like that capturing is performed, for example. The exit gate terminal 40 can perform non-positive authentication that performs identity verification by face recognition using the first target face image captured by the first camera 410 without causing the user U to be aware thereof. Further, when non-positive authentication fails, the exit gate terminal 40 can perform positive authentication that performs identity verification by face recognition using the second target face image captured by the second camera 412 with the user U being aware thereof.

The CPU 402 functions as a control unit that operates by executing a program stored in the storage device 406 and controls the operation of the entire exit gate terminal 40. Further, the CPU 402 executes an application program stored in the storage device 406 to perform various processes as the exit gate terminal 40. The RAM 404 provides a memory field necessary for the operation of the CPU 402.

More specifically, the CPU 402 functions as a comparison request unit that requests the management server 50 for face recognition of the user U who has passed through the entrance gate terminal 30 and entered the gate passage P.

The CPU 402 as the comparison request unit requests the management server 50 to compare, at 1:N, the first target face image, which is a face image of the user U captured by the first camera 410, with a plurality of registered face images registered in the user information DB 506a of the management server 50. Thus, the CPU 402 transmits a face feature amount extracted from the first target face image or the first target face image itself to the management server 50 together with a comparison request.

Note that the CPU 402 functions as a quality determination unit that calculates a quality value indicating the quality of the first target face image and determines whether or not the calculated quality value is greater than or equal to a predetermined threshold. The quality value may be set to be a larger value for a higher quality of the first target face image. The CPU 402 as the comparison request unit can request the management server 50 to compare the high quality first target face image whose quality value is greater than or equal to the predetermined threshold with registered face images. Note that the quality value may be set to be a smaller value for a higher quality of the first target face image. In such a case, the CPU 402 as the quality determination unit can determine whether or not the calculated quality value is less than or equal to a predetermined threshold. Further, in such a case, the CPU 402 as the comparison request unit can request the management server 50 to compare the high quality first target face image whose quality value is less than or equal to the predetermined threshold with registered face images. In such a way, the CPU 402 can determine the quality of the first target face image and request comparison of the high quality first target face image above a predetermined quality with registered face images.

The first target face image is captured by the first camera 410 without causing the user U to be aware. Thus, the first target face image whose quality value is above a predetermined level may not be obtained, or face recognition using the first target face image may be unmatched due to a wearing item on the face, which is worn by the face of the user U, such as a mask, sunglasses, glasses, a hat, or the like. In such cases, the CPU 402 as the comparison request unit requests the management server 50 to compare, at 1:N, the second target face image, which is a face image of the user U captured by the second camera 412, with a plurality of registered face images registered by the user information DB 506a. Thus, the CPU 402 transmits a face feature amount extracted from the second target face image or the second target face image itself to the management server 50 together with a comparison request.

The CPU 402 functions as a warning unit that warns the user U in accordance with a state of the face of the user U during capturing performed by the first camera 410. More specifically, the CPU 402 can perform warning as described below, for example.

First, the CPU 402 can perform line-of-sight detection in the first target face image during capturing performed by the first camera 410. The CPU 402 can perform warning in accordance with the status of the line of sight of the user U detected from the first target face image by line-of-sight detection. That is, when determining that the user U looks down or looks away as a result of line-of-sight detection, the CPU 402 can warn the user U to face forward, which is the exit gate terminal 40 side. For example, the CPU 402 can perform warning by displaying the display on the display 408 that instructs the user U to change the face direction to face forward or sounding a voice from a speaker or the like that instructs the user U to change the face direction to face forward. In such a case, the warning display on the display 408 may be performed before face recognition is performed in order to prevent an unnecessary failure of face recognition.

Further, the CPU 402 can perform wearing item estimation in the captured first target face image during capturing performed by the first camera 410. The CPU 402 can detect a wearing item on the face, such as a mask, sunglasses, glasses, a hat, or the like in the first target face image by the wearing item estimation. When a wearing item on the face is detected, the CPU 402 can warn the user U to put off the wearing item on the face that may prevent face recognition. For example, the CPU 402 can perform warning by displaying the display on the display 408 that instructs the user U to put off the wearing item on the face or sounding a voice from a speaker or the like that instructs the user U to put off the wearing item on the face. In such a case, the warning display on the display 408 may be performed before face recognition is performed in order to prevent an unnecessary failure of face recognition.

Further, the CPU 402 functions as a comparison information acquisition unit that acquires, from the management server 50, comparison information indicating a result of face recognition of the first target face image or the second target face image requested from the management server 50. The comparison information indicates that a registered face image matching the first target face image or the second target face image was found and identity verification of the user U succeeded or no registered face image matching the first target face image or the second target face image was found and identity verification of the user U failed as a result of comparison. Note that a case where the first target face image or the second target face image and a registered face image are matched includes a case where a comparison score indicating the similarity between both face images exceeds a predetermined threshold and both the face images exhibit a high similarity.

Note that, instead of functioning as the comparison request unit and the comparison information acquisition unit, the CPU 402 may be configured to function as a comparison unit that compares, at 1:N, the first target face image or the second target face image with registered face images in the user information DB 506a and outputs comparison information. In such a case, the CPU 402 can perform comparison of a face image by referencing the user information DB 506a of the management server 50 or by referencing the user information DB stored in the storage device 406 in synchronization with the user information DB 506a.

Further, the CPU 402 can function as an information acquisition unit that, when identity verification of the user U by face recognition is successful, acquires gate availability information associated with the user information on the user U from the management server 50. The gate availability information is information that indicates a determination result of the availability of the electronic gate 20 for the user U, as described above.

Further, the CPU 402 functions as a determination unit that determines whether or not the user U inside the gate passage P is allowed to pass through the electronic gate 20 based on a comparison result of face recognition of the first target face image or the second target face image and the determination result of the availability of the electronic gate 20. The CPU 402 as the determination unit determines that passage of the electronic gate 20 is allowed when there is a matching in face recognition of the first target face image or the second target face image and identity verification of the user U is successful and when the user U is allowed to use the electronic gate 20. A case where the identity verification is successful is a case where the first target face image or the second target face image and a registered face image, which is a captured face image or a passport face image acquired by the kiosk terminal 10, are matched. A case where the user U is allowed to use the electronic gate 20 is a case where there is gate availability information that is associated with user information including the matching registered face image and indicates that the user U is allowed to use the electronic gate 20.

Further, the CPU 402 functions as a door control unit that controls an opening operation and a closing operation of the exit gate doors 414. In response to determining that the user U is allowed to pass through the electronic gate 20, the CPU 402 opens the exit gate doors 414 whose normal state is a closed state. Further, in response to determining that the user U has passed through the exit gate terminal 40 and exited the gate passage P based on the output signals from the passage detection sensors 416, the CPU 402 closes the exit gate doors 414.

Further, the CPU 402 functions as a determination unit that determines, based on the output signals from the plurality of passage detection sensors 416 and the output order of the output signals, whether or not the user U has passed through the exit gate terminal 40 and exited the gate passage P.

Further, in response to determining that the user U has passed through the exit gate terminal 40 and exited the gate passage P as described above, the CPU 402 transmits, to the entrance gate terminal 30, exit passage information indicating that the user U has passed through the exit gate terminal 40 and exited the gate passage P.

Further, the CPU 402 functions as a display control unit that controls the display on the display 408. The CPU 402 can cause the display 408 to display various notification to the user U inside the gate passage P. For example, the CPU 402 can cause the display 408 to display warning that instructs the user U inside the gate passage P to put off a wearing item on the face, such as a mask, sunglasses, glasses, a hat, or the like, which may prevent face recognition. Further, for example, the CPU 402 can cause the display 408 to display a notification indicating that the second camera 412 captures a face image, if necessary, to the user U who stops in front of the exit gate doors 414. When there is no matching in a comparison between the first target face image and the registered face image or when the comparison is unable to be performed, the CPU 402 can cause the display 408 to perform display to instruct the user U to stop in front of the exit gate doors 414. In such a case, the CPU 402 may further cause the display 408 to perform display to instruct the user U to stop in front of the exit gate doors 414 and look at the display 408. This can guide the user U so that the second camera 412 is able to capture a face image of the user U.

Further, the CPU 402 functions as a display control unit that controls an indication on the guide indicators 420 in accordance with the open/close state of the exit gate doors 414. When the exit gate doors 414 are in an opened state, the CPU 402 causes the guide indicators 420 to display an indication indicating that exit from the gate passage P is permitted. Further, when the exit gate doors 414 are in a closed state, the CPU 402 causes the guide indicators 420 to display an indication indicating that exit from the gate passage P is prohibited.

The storage device 406 is formed of a storage medium such as a non-volatile memory, a hard disk drive, or the like and functions as a storage unit. The storage device 406 stores a program executed by the CPU 402, data referenced by the CPU 402 in execution of the program, or the like.

The display 408 functions as a display unit that displays various windows to the user U inside the gate passage P. For example, the display 408 displays warning of an instruction to put off a wearing item on the face, such as a mask, sunglasses, glasses, a hat, or the like, which may prevent face recognition. For example, the display 408 displays a notification indicating that the second camera 412 captures the face, if necessary. Specifically, when a comparison is unable to be performed with the first target face image captured by the first camera 410, the display 408 displays display that instructs the user to stop in front of the display 408 and look at the direction of the second camera 412 so that positive authentication is enabled. For example, the display 408 may display such display that instructs the user to stop in front of the display 408 and look at the second camera 412 for face authentication or the like. Further, the display 408 can display a comparison result of positive authentication with the second target face image, which is a face image of the static user U, as a result of non-positive authentication with the first target face image, which is a face image of the moving user U.

The first camera 410 functions as a biometrics information acquisition unit that captures the user U who enters the gate passage P and moves toward the exit gate terminal 40 on the gate passage P and acquires the first target face image, which is a face image of the user U, as biometrics information on the user U. The first target face image captured by the first camera 410 is a face image of the moving user U. For example, the first camera 410 is an image capture device such as a digital camera that captures a moving image or a static image of the user U moving on the gate passage P and acquires the first target face image of the user U from the captured moving image or static image. As described above, the first camera 410 is a long-range camera that has a capturable range in at least the inside of the gate passage P between the entrance gate terminal 30 and the exit gate terminal 40 and can capture a more distant place than the second camera 412. The first camera 410 captures the user U without causing the user U to be aware of being captured. Note that, instead of the first camera 410, a unit that acquires, from the user U, the same type of biometrics information as the registered biometrics information registered in the user information DB 506a of the management server 50 may be provided as the biometrics information acquisition unit.

The second camera 412 functions as a biometrics information acquisition unit, if necessary, that captures the user U who moves on the gate passage P and reaches and stops at the exit gate doors 414 of the exit gate terminal 40 and acquires the second target face image, which is a face image of the user U, as biometrics information on the user U. The second target face image captured by the second camera 412 is a face image of the static user U. For example, the second camera 412 is a capturing apparatus such as a digital camera that captures a moving image or a static image of the user U in front of the exit gate doors 414 and captures the second target face image of the user U from the captured moving image or static image. As described above, the second camera 412 is a short-range camera that has a capturable range in at least a front area of the exit gate terminal 40. The second camera 412 captures the user U who has received a notification of capturing by way of display on the display 408, voice guidance, or the like, for example. The second camera 412 acquires the second target face image to be compared with a registered face image from the user U who stops in front of the exit gate doors 414 in a predetermined case. The predetermined case as used herein is a case where there is no matching in a comparison between the first target face image and the registered face image or the comparison is unable to be performed, as described later. Specifically, the predetermined case is a case where the face of the user U who moves toward the closed exit gate doors 414 is not directed to the exit gate doors 414, a case where a wearing item is worn by the face of the user U, or the like. Note that, instead of the second camera 412, a unit that acquires, from the user U, the same type of biometrics information as the registered biometrics information registered in the user information DB 506a of the management server 50 may be provided as the biometrics information acquisition unit.

The exit gate doors 414 are closure doors that performs an opening operation and a closing operation under the control of the CPU 402 and transitions between a closed state to block passage of the user U and an opened state to permit passage of the user U. The opening and closing scheme of the exit gate doors 414 is not particularly limited and may be, for example, a flapper type, a slide type, a revolving type, or the like.

In response to detecting passage of the user U, each of the passage detection sensors 416 outputs an output signal indicating the passage of the user U. The CPU 402 can determine whether or not the user U has passed through the exit gate terminal 40 and exited the gate passage P based on the output signals from the plurality of passage detection sensors 416 provided on the pair of casings 424 so as to be aligned in the outward direction from the gate passage P and the output order of the output signals. The passage detection sensor 416 is not particularly limited and may be, for example, a transmission type photoelectric sensor, a reflection type photoelectric sensor, or the like as with the passage detection sensor 310 of the entrance gate terminal 30.

The communication unit 418 is connected to the network NW and transmits and receives data via the network NW. The communication unit 418 communicates with the management server 50, the entrance gate terminal 30, or the like under the control of the CPU 402. Note that the communication unit 418 may be connected to the entrance gate terminal 30 so as to be able to communicate with the entrance gate terminal 30 without via the network NW.

The guide indicators 420 display an indication indicating whether to permit or refuse exit from the gate passage P under the control of the CPU 402. When the exit gate doors 414 are in a closed state, the guide indicators 420 display an indication indicating that exit from the gate passage P is prohibited. Further, when the exit gate doors 414 are in an opened state, the guide indicators 420 display an indication indicating that exit from the gate passage P is permitted. The guide indicators 420 can display an indication indicating whether to permit or refuse exit from the gate passage P by using a color indication, a symbol indication, a text indication, or the like, for example.

In such a way, the exit gate terminal 40 is configured.

Figure 14:
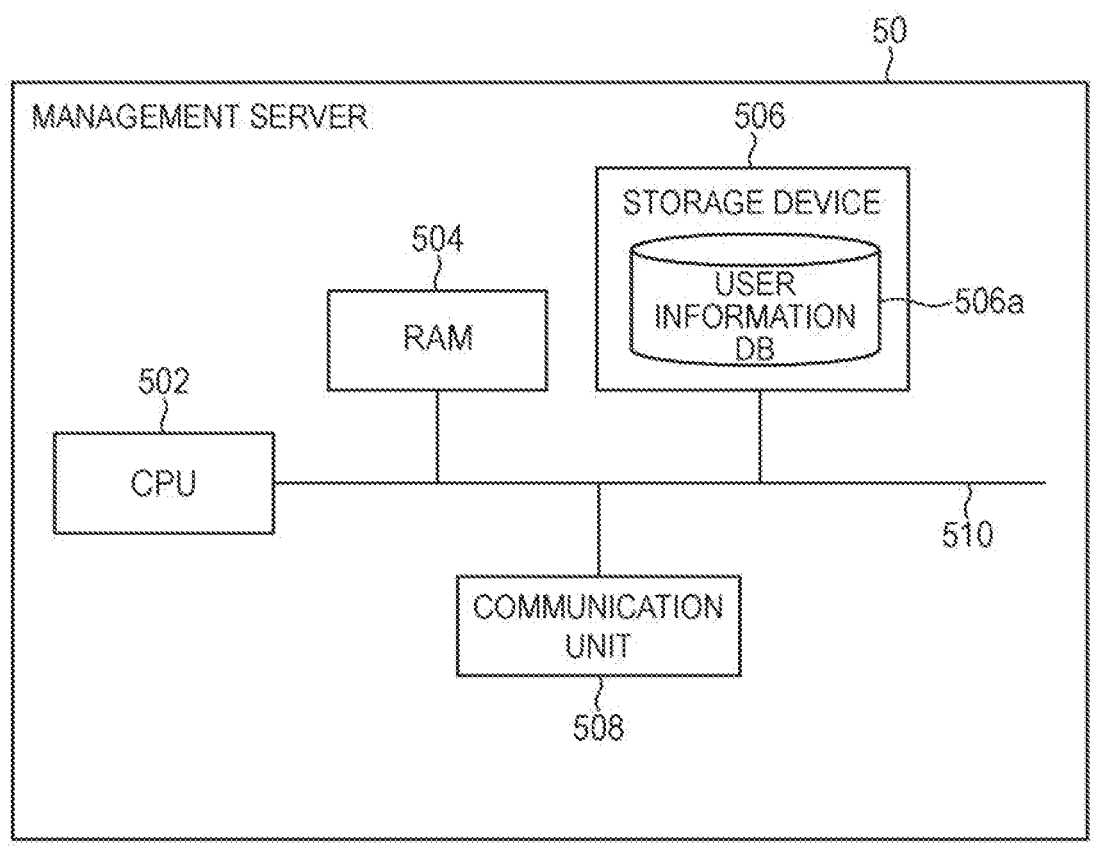
FIG. 14 is a block diagram illustrating one example of a hardware configuration of a management server according to one example embodiment of the present invention.

Next, the configuration of the management server 50 will be described by using FIG. 14. FIG. 14 is a block diagram illustrating one example of the hardware configuration of the management server 50.

The management server 50 is an information processing apparatus that manages the information processing system 1 and performs comparison between a first target face image or a second target face image and a plurality of registered face images in the user information DB 506*a*, determination of the declaration detail included in declaration information, or the like. Note that the function of the management server 50 may be implemented by a single server or may be implemented by a plurality of servers.

As illustrated in FIG. 14, the management server 50 has a CPU 502, a RAM 504, a storage device 506, and a communication unit 508. The CPU 502, the RAM 504, the storage device 506, and the communication unit 508 are connected to a bus line 510.

The CPU 502 functions as a control unit that operates by executing a program stored in the storage device 506 and controls the operation of the entire management server 50. Further, the CPU 502 executes an application program stored in the storage device 506 to perform various processes as the management server 50. The RAM 504 provides a memory field necessary for the operation of the CPU 502.

More specifically, the CPU 502 functions as a comparison unit that, when a comparison request that requests face recognition of the user U is received from the kiosk terminal 10, performs face recognition of the user U. The CPU 502 as a comparison unit compares, at 1:1, a captured face image included in the user information with a passport face image. The CPU 502 can compare both face images by referencing a face feature amount extracted from a captured face image with a face feature amount extracted from a passport face image in the comparison between the captured face image and the passport face image.

Further, the CPU 502 functions as a transmission unit that transmits comparison information indicating a result of face recognition of the user U to the kiosk terminal 10 which has transmitted a comparison request. The comparison information indicates that there is a matching in the comparison or there is no matching in the comparison. That is, the comparison information indicates that a captured face image and a passport face image are matched and identity verification of the user U performing customs declaration succeeded or that a captured face image and a passport face image are not matched and identity verification of the user U failed as a result of the comparison.

Further, the CPU 502 functions as a determination unit that, when user information on the user U is received from the kiosk terminal 10, determines the declaration detail included in declaration information on the user U. The CPU 502 as the determination unit determines from the declaration detail included in declaration information on the user U whether or not the user U is taxable or whether or not there is a risk in the user U. A case where the user U is taxable and a case where there is a risk in the user U are the same as described above, respectively.

Further, the CPU 502 functions as a transmission unit that transmits determination information indicating a determination result of the declaration detail included in the declaration information on the user U to the kiosk terminal 10 that has transmitted user information. The determination information indicates whether or not the user U is taxable or whether or not there is a risk in the user U as a result of the determination, as described above.

The CPU 502 functions as an information management unit that stores and manages user information on the user U received from the kiosk terminal 10 in the storage device 506. The CPU 502 as the information management unit registers and manages user information received from the kiosk terminal 10 in the user information DB 506*a* stored in the storage device 506. The CPU 502 registers the received user information to the user information DB 506*a* every time receiving user information from the kiosk terminal 10.

As described above, user information on the user U includes identity related information, face information, and declaration information on the user U associated with each other. Face information corresponds to a captured face image and a passport face image or face feature amounts extracted therefrom acquired by the kiosk terminal 10. A captured face image or a passport face image registered in the user information DB 506*a* is used as a registered face image, which corresponds to registered biometrics information registered in advance. While both a captured face image and a passport face image can be used as a registered face image, a captured face image that is newer than a passport face image may be used as a registered face image. The registered face image, which is a captured face image or a passport face image registered in the user information DB 506*a*, or the face feature amount thereof is used in face recognition for identity verification of the user U at the electronic gate 20.

Further, when gate availability information is received from the kiosk terminal 10, the CPU 502 registers the gate usage availability to the user information DB 506*a* in association with the user information. The gate availability information is information indicating a determination result of the availability of the electronic gate 20 for the user U who performs customs declaration, as described above.

Note that the CPU 502 may also register user information on the user U who is determined to be allowed to use the electronic gate 20 to the user information DB 506*a* based on the gate availability information. That is, the CPU 502 may not register user information on the user U who is determined to be not allowed to use the electronic gate 20 to the user information DB 506*a*.

Further, the CPU 502 may also determine whether or not the user U is allowed to use the electronic gate 20 in a similar manner to the kiosk terminal 10 and acquire gate availability information instead of receiving gate availability information from the kiosk terminal 10.

Further, the CPU 502 can delete user information in the user information DB 506*a* from the registration after a certain time period has elapsed. For example, the CPU 502 can delete user information after a time period normally required from completion of customs declaration on the kiosk terminal 10 to passage of the electronic gate 20 in the custom inspection site C has elapsed.

Further, when a comparison request that requests face recognition of the user U from the exit gate terminal 40 is received, the CPU 502 functions as a comparison unit that performs face recognition of the user U. The CPU 502 as the comparison unit compares, at 1:N, the first target face image or the second target face image or the face feature amount thereof with a plurality of registered face images registered in the user information DB 506*a* or the face feature amount thereof. The CPU 502 can compare both face images by comparing the face feature amount extracted from the first target face image or the second target face image with the face feature amount extracted from the registered face images in the comparison between the first target face image or the second target face image and the registered face images.

The CPU 502 as the comparison unit attempts to find a registered face image matching the first target face image or the second target face image from a plurality of registered face images by comparison between the first target face image or the second target face image and the plurality of registered face images. Further, the CPU 502 attempts to find a face feature amount of a registered face image matching the face feature amount of the first target face image or the second target face image from a plurality of face feature amounts of registered face images by comparison between the face feature amount of the first target face image or the second target face image and the plurality of face feature amount of registered face images. Note that a case where the first target face image or the second target face image and the registered face image are matched includes a case where a comparison score indicating the similarity between both face images exceeds a predetermined threshold and both the face images exhibit a high similarity. Further, a case where a face feature amount of the first target face image or the second target face image and a face feature amount of the registered face image are matched includes a case where a comparison score indicating the similarity between both face feature amounts exceeds a predetermined threshold and both the face feature amounts exhibit a high similarity.

The CPU 502 functions as a transmission unit that transmits comparison information indicating a result of comparison to the exit gate terminal 40 that has transmitted a comparison request. The comparison information indicates that there is a matching in the comparison or there is no matching in the comparison. That is, the comparison information indicates that a registered face image matching the first target face image or the second target face image was found and identity verification of the user U succeeded or that no matching registered face image was found and identity verification of the user U failed as a result of the comparison. Further, the comparison information indicates that a face feature amount of a registered face image matching the face feature amount of the first target face image or the second target face image was found and identity verification of the user U succeeded or that no matching face feature amount of a registered face image was found and identity verification of the user U failed as a result of the comparison. Note that the CPU 502 may compare the first target face image or the second target face image or the face feature amount thereof with a single registered face image or the face feature amount thereof.

The CPU 502 can delete a registered face image which matches the first target face image or the second target face image or user information including the registered face image from the user information DB 506a. Further, the CPU 502 can delete a face feature amount of the registered face image which matches the face feature amount of the first target face image or the second target face image or user information including the face feature amount of that registered face image from the user information DB 506a.

Further, the CPU 502 functions as a transmission unit that transmits gate availability information to the exit gate terminal 40, if necessary.

The storage device 506 is formed of a storage medium such as a non-volatile memory, a hard disk drive, or the like and functions as a storage unit. The storage device 506 stores a program executed by the CPU 502, data referenced by the CPU 502 when the program is executed, or the like.

Further, the storage device 506 stores the user information DB 506a. A plurality of pieces of user information on a plurality of users U who have performed customs declaration by using the kiosk terminal 10 are registered in the user information DB 506a. Further, gate availability information on the user U is registered in the user information DB 506a in association with the user information.

The communication unit 508 is connected to the network NW and transmits and receives data via the network NW. The communication unit 508 communicates with the kiosk terminal 10, the exit gate terminal 40, or the like under the control of the CPU 502.

In such a way, the management server 50 is configured.

The kiosk terminal 10 in accordance with the present example embodiment by causing the camera 116 provided between the display 110 and both the passport reading device 112 and the code reading device 114 to capture the user U who operates the kiosk terminal 10. The user U will face the camera 116 when looking at the display 110, holding the passport over the passport reading device 112, or holding the mobile terminal 60 over the code reading device 114. Thereby, the kiosk terminal 10 captures the face of the user U by the camera 116 and acquires a captured face image during the reading, namely, in parallel to reading of a passport by the passport reading device 112 or reading of a declaration code by the code reading device 114. Since the user U necessarily faces the camera 116 provided between the display 110 and both the passport reading device 112 and the code reading device 114, it is not necessary to instruct the user U to suspend the operation on the kiosk terminal 10 and face the camera 116. Further, the kiosk terminal 10 can perform reading of a passport by the passport reading device 112 or reading of a declaration code by the code reading device 114 at the same time or in any order.

Therefore, according to the kiosk terminal 10 of the present example embodiment, procedures on the kiosk terminal 10 including reading of a passport, reading of a declaration code, and acquisition of a captured face image used in face recognition can be completed in a short time. Further, since the kiosk terminal 10 can capture the face of the user U during reading of a passport or a declaration code, this does not cause the user U to be aware of the capturing, and therefore a mental burden on the user U can be reduced.

Further, the exit gate terminal 40 of the electronic gate 20 according to the present example embodiment compares the first target face image, which is acquired by causing the first camera 410 to capture the user U moving toward the exit gate terminal 40, with registered face images registered in the user information DB 506a of the management server 50. The first target face image can be acquired without the user U stopping. Therefore, according to the electronic gate 20 of the present example embodiment, face recognition of the user U can be effectively performed by using the first target face image. This can reduce the time required for the user U to pass through the electronic gate 20. Further, when there is no matching in a comparison of the first target face image or the comparison is unable to be performed, the exit gate terminal 40 compares the second target face image, which is acquired by causing the second camera 412, with registered face images to capture the user U stopping in front of the exit gate doors 414. Therefore, according to the electronic gate 20 of the present example embodiment, identity verification by face recognition of the user U can be reliably performed.

Furthermore, the exit gate terminal 40 of the electronic gate 20 according to the present example embodiment opens the exit gate doors 414 in accordance with a determination result of the gate usage availability determined in advance. Therefore, according to the electronic gate 20 of the present example embodiment, the time required for passage of the electronic gate 20 by the user U can be reduced.

The operation of each component in the information processing system 1 according to the present example embodiment and a control method that realizes the operation will be further described below by using FIG. 15A to FIG. 20.

Figure 15B:
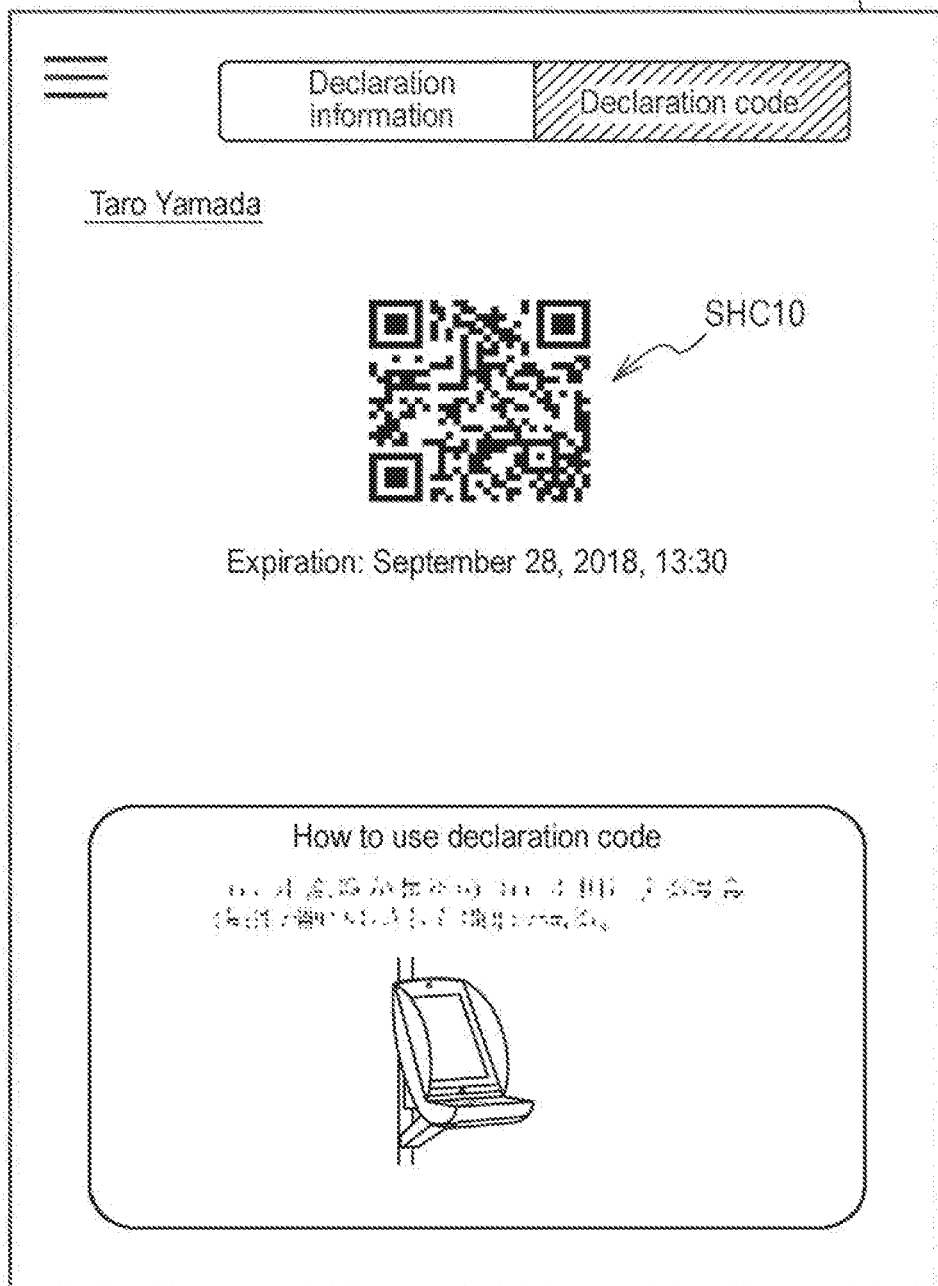
FIG. 15B is a schematic diagram illustrating one example of a declaration code display window on the mobile terminal according to one example embodiment of the present invention.
Figure 16:
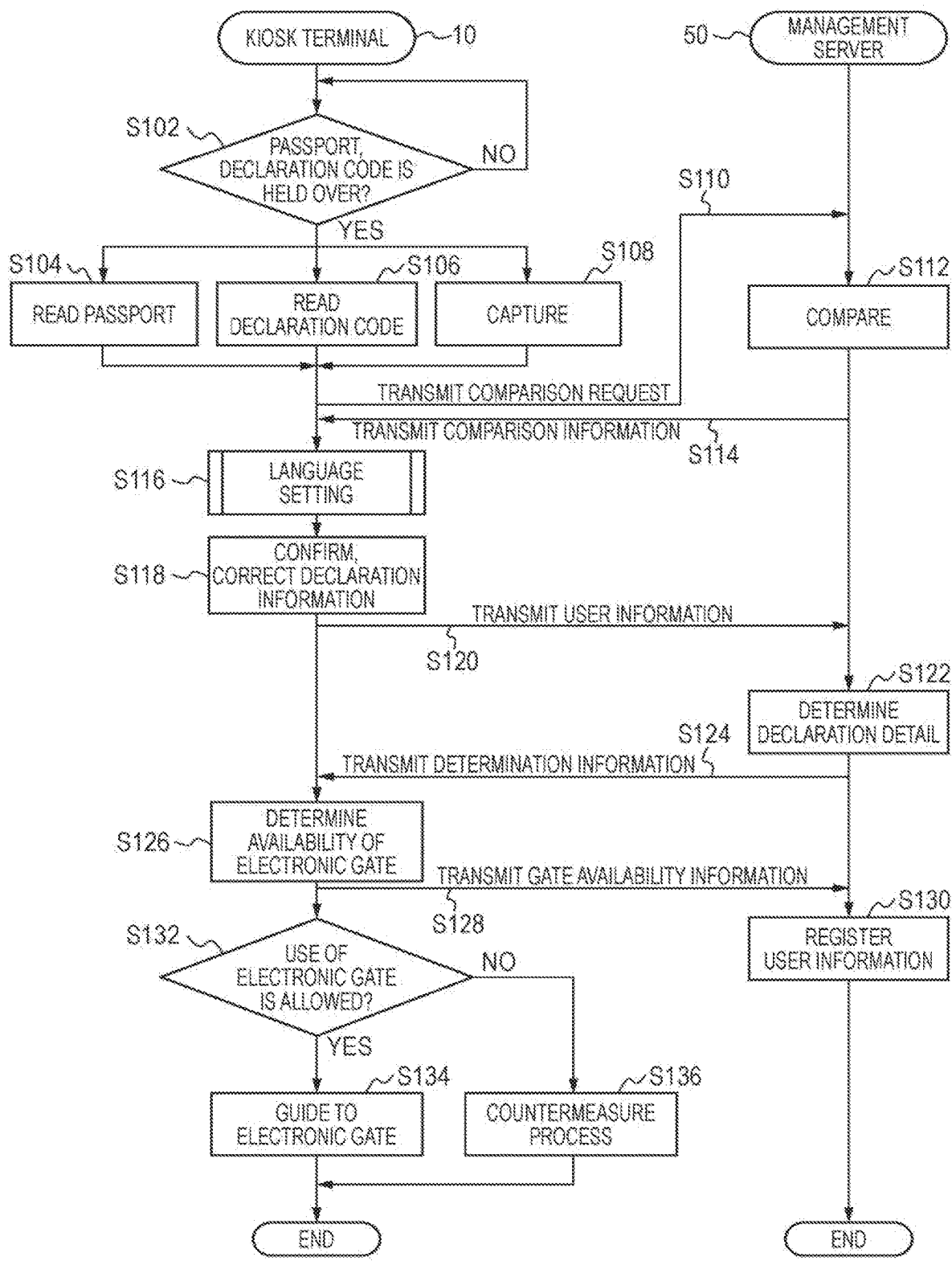
FIG. 16 is a sequence diagram illustrating the operation of the kiosk terminal and the management server in the information processing system according to one example embodiment of the present invention.
Figure 17:
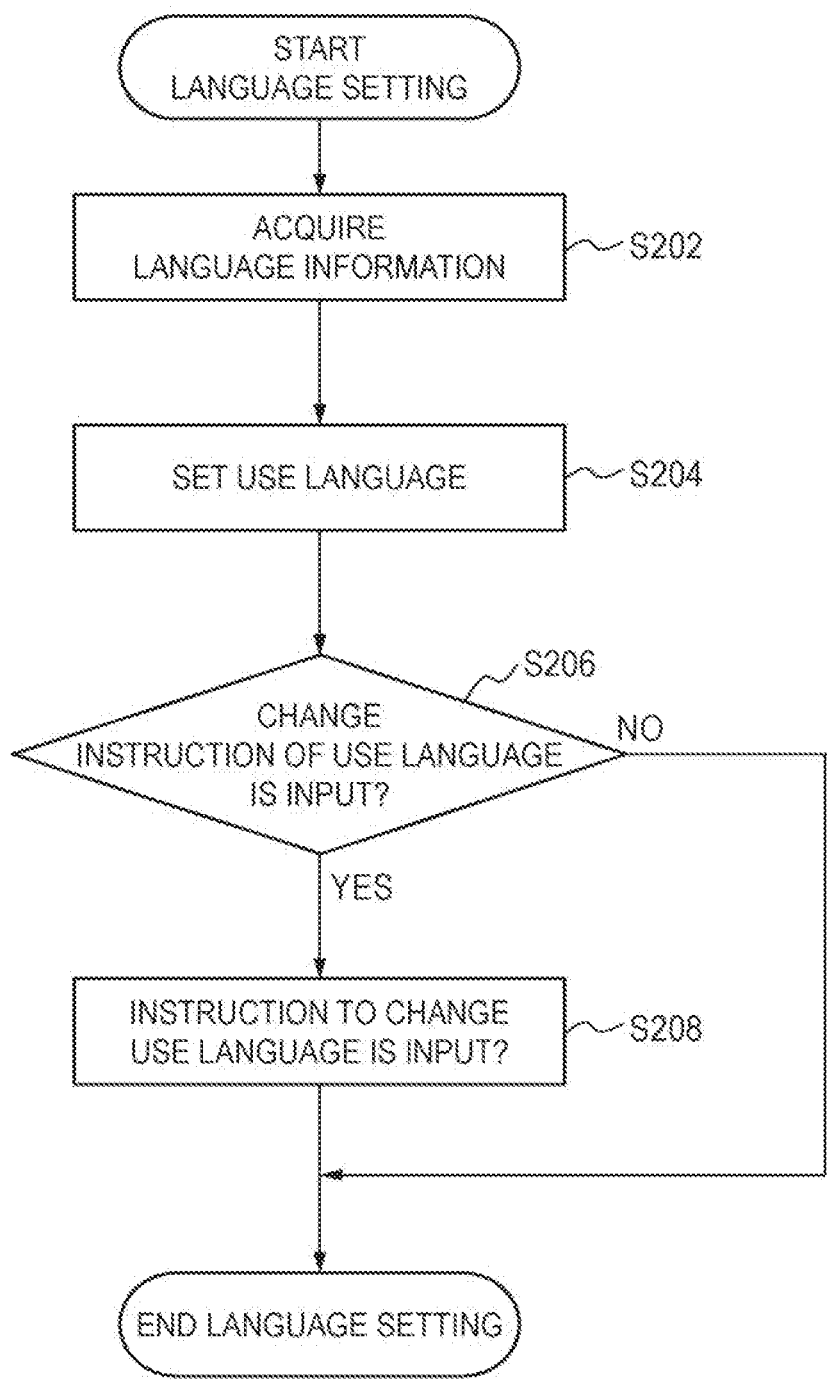
FIG. 17 is a sequence diagram illustrating a language setting operation of the kiosk terminal in the information processing system according to one example embodiment of the present invention.
Figure 18A:
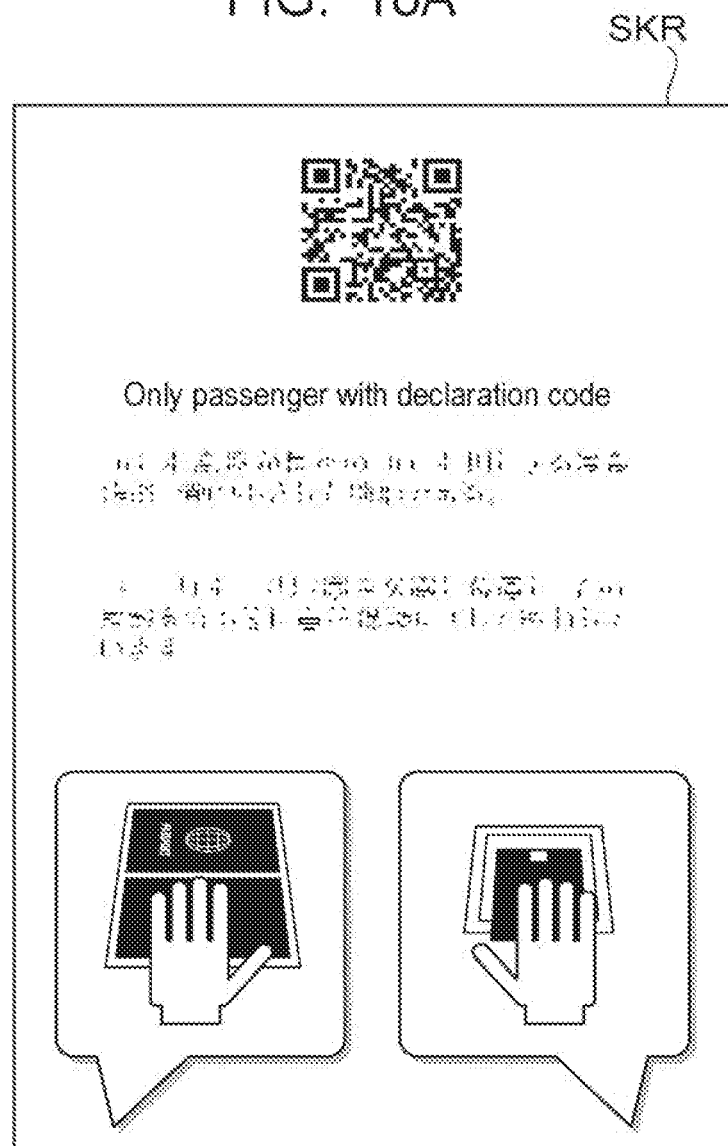
FIG. 18A is a schematic diagram illustrating one example of a reception window on the kiosk terminal according to one example embodiment of the present invention.

First, the operation of the kiosk terminal 10 will be described by using FIG. 15A to FIG. 18C together with the operation of the management server 50. FIG. 15A is a schematic diagram illustrating one example of a declaration information entry window on the mobile terminal 60. FIG. 15B is a schematic diagram illustrating one example of a declaration code display window on the mobile terminal 60. FIG. 16 is a sequence diagram illustrating the operation of the kiosk terminal 10 and the management server 50. FIG. 17 is a sequence diagram illustrating a language setting operation of the kiosk terminal 10. FIG. 18A is a schematic diagram illustrating one example of a reception window on the kiosk terminal 10. FIG. 18B is a schematic diagram illustrating one example of a declaration detail confirmation window on the kiosk terminal 10. FIG. 18C is a schematic diagram illustrating one example of a guide window on the kiosk terminal 10.

For example, the user U who arrived at an airport from a foreign country by an airplane goes through immigration at an immigration site, reception of deposited baggage at a baggage claim site, or the like and moves to the custom inspection site C to carry out customs declaration. The user U inputs declaration information on a customs declaration application executed on the mobile terminal 60 to generate and display a declaration code including declaration information. Note that the user U may generate and display the declaration code before using the kiosk terminal 10.

FIG. 15A illustrates a declaration information entry window SHE of the customs declaration application on the mobile terminal 60. The declaration information entry window SHE has a declaration information entry field SHE10 for entry of information to be declared in declaration in baggage clearance, for example. In the declaration information entry field SHE10, information to be declared in the declaration by Customs Form C No. 5360, Export/Import Declaration for Consigned Articles (Accompanied Articles/Unaccompanied Articles) in a case of declaration in Japan can be input, for example. That is, the declaration information entry field SHE10 can accept entry of boarding information, which is information regarding boarding of the user U such as a flight number, an origin, a date of entry and answers to questions. Note that, in the customs declaration application, basic information on the user U, which does not change for each customs declaration, such as the name, the current address, the telephone number, the birthday, the passport number, or the like of the user U out of the declaration information can be input in a user registration window (not illustrated) or a setting window (not illustrated) and registered in advance.

FIG. 15B illustrates a declaration code display window SHC of the customs declaration application on the mobile terminal 60. The declaration code display window SHC has a declaration code display field SHC10 in which a declaration code including declaration information input in the declaration information entry window SHE is generated and displayed. The declaration code displayed in the declaration code display field SHC10 further includes language information regarding a use language in the customs declaration application in addition to declaration information. Further, in the declaration code display filed SHC10, date and time that is the term of validity of a declaration code, description of how to use a declaration code, or the like can be displayed.

The user U who has entered the customs inspection site C performs customs declaration on the kiosk terminal 10 installed near the entrance of the customs declaration site C. Note that the user U may generate and display a declaration code on the mobile terminal 60 before coming in front of the kiosk terminal 10. At this time, the user U may reference guide such as description of how to use a declaration code displayed on the customs declaration application of the mobile terminal 60, description of how to proceed the procedure on the kiosk terminal 10 displayed on the digital signage terminal 70 installed near the kiosk terminal 10, or the like.

As illustrated in FIG. 16, the CPU 102 of the kiosk terminal 10 continuously determines whether or not a passport is held over the passport reading device 112 or a declaration code is held over the code reading device 114, respectively (step S102). In such a way, the CPU 102 waits until at least one of a passport and a declaration code is held over (step S102, NO).

FIG. 18A illustrates one example of a reception window SKR displayed on the display 110 on the kiosk terminal 10 that is waiting for at least one of a passport and a declaration code to be held over by the user U. The reception window SKR displays that a declaration code is required for use of the kiosk terminal 10 and description of how to hold a passport and a declaration code over, for example.

As illustrated in FIG. 16, if it is determined that a passport is held over (step S102, YES), the CPU 102 reads and acquires passport information on the user U from the passport, such as identity related information, a passport face image, or the like by the passport reading device 112 (step S104). Further, if it is determined that a declaration code is held over (step S102, YES), the CPU 102 reads and acquires declaration information and language information from the declaration code by the code reading device 114 (step S106).

Note that the user U may hold the passport over the passport reading device 112 to cause the passport to be read earlier than reading of the declaration code, or may hold the declaration code over the code reading device 114 and cause the declaration code to be read earlier than reading of the passport. Further, the user U may hold the passport and the declaration code over the passport reading device 112 and the code reading device 114 at the same time and cause the passport and the declaration code to be read, respectively. The CPU 102 can perform reading of a passport by the passport reading device 112 and reading of a declaration code by the code reading device 114 in any order or at the same time in accordance with the timing when the user U causes the passport and the declaration code to be read.

Further, the CPU 102 can suspend a process when it is detected that a certain time period has elapsed or the user U left the kiosk terminal 10 with one of the passport and the declaration code being read but then the other was not being held over. In such a case, the CPU 102 can cause the display 110 to display an error indication or the like or perform a reset process to nullify the process performed so far, for example. Then, the CPU 102 can proceed to step S102. Note that the CPU 102 can detect that the user U left the kiosk terminal 10 based on a moving image captured by the camera 116 or static images continuously captured by the camera 116, for example.

Furthermore, if it is determined that a passport or a declaration code is held over (step S102, YES), the CPU 102 causes the camera 116 to capture the face of the user U and acquires a captured face image of the user U (step S108). The CPU 102 can cause the camera 116 to capture the face of the user U in parallel to reading of the passport by the passport reading device 112 or reading of the declaration code by the code reading device 114, namely, during reading of the passport or the declaration code. The camera 116 can start capturing in response to the passport or the declaration code being held over.

In such a way, the CPU 102 causes the camera 116 to capture a face image of the user U who causes the passport reading device 112 to read the passport or causes the code reading device 114 to read the declaration code in front of the kiosk terminal 10 and acquires a captured face image.

The camera 116 is provided such that the capturing direction thereof is a forward diagonally upward direction and has a view angle so as to be able to capture the face of the user U directing his/her eyes in the forward diagonally downward direction and looking down at display 110, the passport reading device 112, or the code reading device 114 and operating the kiosk terminal 10, as described above. Thus, the camera 116 can capture the face of the user U looking down at the display 110, the passport reading device 112, or the code reading device 114 and operating the kiosk terminal 10 without causing the user U to be aware of the capturing. For example, it is not necessary to request the user U to face the direction of the camera 116 in capturing by the camera 116.

Further, the camera 116 can acquire a plurality of face images for the user U who operates the kiosk terminal 10 by capturing a moving image at a predetermined framerate or capturing static images at predetermined time intervals. In such a case, the CPU 102 can select and acquire a face image having the highest quality as a captured face image of the user U out of the plurality of face images of the user U captured by the camera 116. The camera 116 can start capturing in response to a passport or a declaration code being held over as a trigger. The quality of a face image can be evaluated with respect to the direction of the face relative to the camera 116, for example, and a face image can be evaluated as being above a predetermined quality when the direction of the face relative to the camera 116 is within a predetermined range.

In response to acquiring a passport face image of the user U from a passport and acquiring a captured face image of the user U by the camera 116, the CPU 102 transmits a comparison request that requests face recognition of the user U to the management server 50 via the network NW (step S110). The CPU 102 transmits the captured face image and the passport face image or face feature amounts thereof to the management server 50 together with the comparison request.

In response to receiving the comparison request from the kiosk terminal 10, the CPU 502 of the management server 50 performs face recognition of the user U (step S112). The CPU 502 compares the captured face image with the passport face image at 1:1.

Next, the CPU 502 transmits comparison information indicating a result of the comparison between the captured face image and the passport face image to the kiosk terminal 10 via the network NW (step S114).

In such a way, face recognition of the user U to compare the captured face image with the passport face image is performed while the user U is operating the kiosk terminal 10.

Note that, when there is no matching in the comparison between the captured face image and the passport face image, the kiosk terminal 10 can re-capture a captured face image by again performing step S108 of causing the camera 116 to capture the face of the user U and acquiring a captured face image of the user U. The kiosk terminal 10 can perform re-capturing of a captured face image once or multiple times.

Further, the CPU 102 sets a use language on the kiosk terminal 10 for confirmation and, if necessary, correction of the declaration detail by the user U (step S116). In setting of a use language, first, the CPU 102 acquires language information read from a declaration code, as illustrated in FIG. 17 (step S202)

Next, the CPU 102 sets a use language in the customs declaration application indicated by the acquired language information as a use language on the kiosk terminal 10 (step S204). Here, the use language in the customs declaration application set as a use language on the kiosk terminal 10 is a language set in the language setting in the mobile terminal 60 or, if a language is set in setting in the customs declaration application, the set language. Thereby, the CPU 102 can cause the display 110 to display various information in the same use language as the use language in the customs declaration application of the mobile terminal 60 used by the user U. Further, the CPU 102 can accept input by the user U from the input device 108 such as a touchscreen embedded in the display 110 in the same use language as the use language in the customs declaration application of the mobile terminal 60 used by the user U.

Further, the CPU 102 determines whether or not there is entry of a change instruction by the user U via the input device 108 to instruct a change to another language of use languages (step S206). If there is no entry of a change instruction (step S206, NO), the CPU 102 maintains the use language set in step S204.

If there is entry of a change instruction (step S206, YES), the CPU 102 changes the use language of the kiosk terminal 10 to another language instructed by the change instruction (step S208).

In such a way, even when the user U is a foreigner, the user U is able to confirm the displayed content and input information in the language which the user U uses on the kiosk terminal 10 by himself/herself or the language which the user U instructs the kiosk terminal 10 to change by himself/herself. Thus, the user U is able to use the kiosk terminal 10 smoothly without the language being an obstacle.

After setting the use language on the kiosk terminal 10, the CPU 102 displays the declaration detail of declaration information read from the declaration code on the display 110 to have the user U confirm the declaration detail as illustrated in FIG. 16 and accepts correction from the user U, if necessary (step S118). The user U confirms the declaration detail displayed on the display 110 and corrects the declaration detail via the input device 108 if it is necessary to correct the declaration detail. The user U who has confirmed the declaration detail inputs a finalization instruction to finalize the declaration detail via the input device 108. Thereby, the declaration detail declared by the user U in customs declaration is finalized.

FIG. 18B illustrates one example of the declaration detail confirmation window SKC displayed on the display 110 of the kiosk terminal 10 on which confirmation of the declaration detail and correction, if necessary, are performed by the user U. The declaration detail confirmation window SKC displays the declaration detail included in declaration information. For example, in response to a correction button being pressed by touch entry by the user U, the declaration detail confirmation window SKC can be transitioned to a declaration detail correction window on which correction of the declaration detail is enabled. Further, on the declaration detail confirmation window SKC, in response to a confirmation button being pressed by the touch input by the user U, the finalization instruction is input to the kiosk terminal 10, for example. Thereby, the declaration detail declared by the user U in the customs declaration is finalized.

Note that the CPU 102 can display the declaration detail confirmation window SKC in which the layout is the same as the declaration information entry window SHE of the customs declaration application illustrated in FIG. 15A displayed on the display 610 of the mobile terminal 60. With the same layout being used for both windows, it is possible to realize window display where the user U is less likely to be confused in the operation of the kiosk terminal 10.

When the declaration detail is finalized, the CPU 102 transmits user information on the user U to the management server 50 via the network NW, as illustrated in FIG. 16 (step S120). The user information includes identity related information, face information, and declaration information on the user U associated with each other. Note that, since CPU 102 transmits the captured face image and the passport face image together with the comparison request in step S110, face information of the user information may not be transmitted again.

Next, the CPU 502 determines the declaration detail included in declaration information of user information on the user U (step S122). The CPU 502 determines whether or not the user U is taxable or whether or not there is a risk in the user U from the declaration detail included in the declaration information on the user U.

Furthermore, the CPU 502 can perform comparison of the passport number in addition to determination of the declaration detail. In such a case, the CPU 502 compares a passport number included in the identity related information in the user information with a passport number included in the declaration information in the user information.

Next, the CPU 502 transmits determination information indicating a determination result of the declaration detail included in the declaration information on the user U to the kiosk terminal 10 via the network NW (step S124). Further, the CPU 502 can include the comparison result of the passport numbers in the determination information.

In response to receiving the determination information from the management server 50, the CPU 102 of the kiosk terminal 10 determines whether or not the user U is allowed to use the electronic gate 20 based on the received determination information and the previously received comparison information (step S126). The previously received comparison information is the information transmitted from the management server 50 in step S114. Note that the CPU 102 can cause the display 110 to display and indicate the comparison information indicating a result of the comparison between the captured face image and the passport face image and the determination information indicating a determination result of the declaration detail to the user U.

When the passport face image and the captured face image of the user U are matched, the user U is not taxable, and there is no risk in the user U, the CPU 102 determines that the user U is allowed to use the electronic gate 20. When the determination information includes a comparison result of the passport numbers, the CPU 102 determines that the user U is allowed to use the electronic gate 20 when the passport face image and the captured face image of the user U are matched, the user U is not taxable, there is no risk in the user U, and the passport numbers are matched.

On the other hand, when the passport face image and the captured face image of the user U are not matched, the user U is taxable, or there is a risk in the user U, the CPU 102 determines that the user U is not allowed to use the electronic gate 20. Further, when the determination information includes a comparison result of the passport numbers, the CPU 102 determines that the user U is not allowed to use the electronic gate 20 also when the passport numbers are not matched.

The CPU 102 transmits gate availability information indicating the determination result of the availability of the electronic gate 20 to the management server 50 (step S128). The gate availability information indicates that the user U is allowed to use the electronic gate 20 when the passport face image and the captured face image of the user U are matched, the user U is not taxable, and there is no risk in the user U. Further, when the determination information includes a comparison result of the passport numbers, the gate availability information indicates that the user U is allowed to use the electronic gate 20 when the passport numbers are matched.

In response to receiving the gate availability information from the kiosk terminal 10, the CPU 502 of the management server 50 registers user information on the user U to the user information DB 506a in association with the gate availability information (step S130). Note that the CPU 502 may determine whether or not the user U is allowed to use the electronic gate 20 based on comparison information and determination information in a similar manner to the CPU 102 of the kiosk terminal 10 instead of receiving the gate availability information from the kiosk terminal 10.

Further, the CPU 502 may register user information on a particular user U to the user information DB 506a instead of registering user information to the user information DB 506a in association with the gate availability information. That is, the CPU 502 may register user information on the user U who is determined to be allowed to use the electronic gate 20 to the user information DB 506a based on the gate availability information. That is, the CPU 502 may not register user information on the user U other than the particular user U to the user information DB 506a.

Next, if it is determined that the user U is allowed to use the electronic gate 20 (step S132, YES), the CPU 102 of the kiosk terminal 10 performs a process to guide the user U to the electronic gate 20 (step S134). For example, the CPU 102 causes the display 110 to display a guide window, which guides the user U to the electronic gate 20, and guide the user U to the electronic gate 20.

FIG. 18C illustrates one example of a guide window SKG displayed on the display 110 of the kiosk terminal 10 to guide the user U to the electronic gate 20. For example, the guide window SKG indicates a text, a symbol, a picture, or the like indicating that the customs declaration is completed together with a text, a symbol, a picture, or the like to guide the user U to the electronic gate 20.

On the other hand, if it is determined that the user U is not allowed to use the electronic gate 20 (step S132, NO), the CPU 102 performs a countermeasure process on the user who is not allowed to use the electronic gate 20 (step S136). For example, the CPU 102 causes the display 110 to display a guide window, which guides the user U to the manned booth M, and guide the user U to the manned booth M as the countermeasure process.

In such a way, customs declaration by the user U is performed on the kiosk terminal 10.

Figure 19:
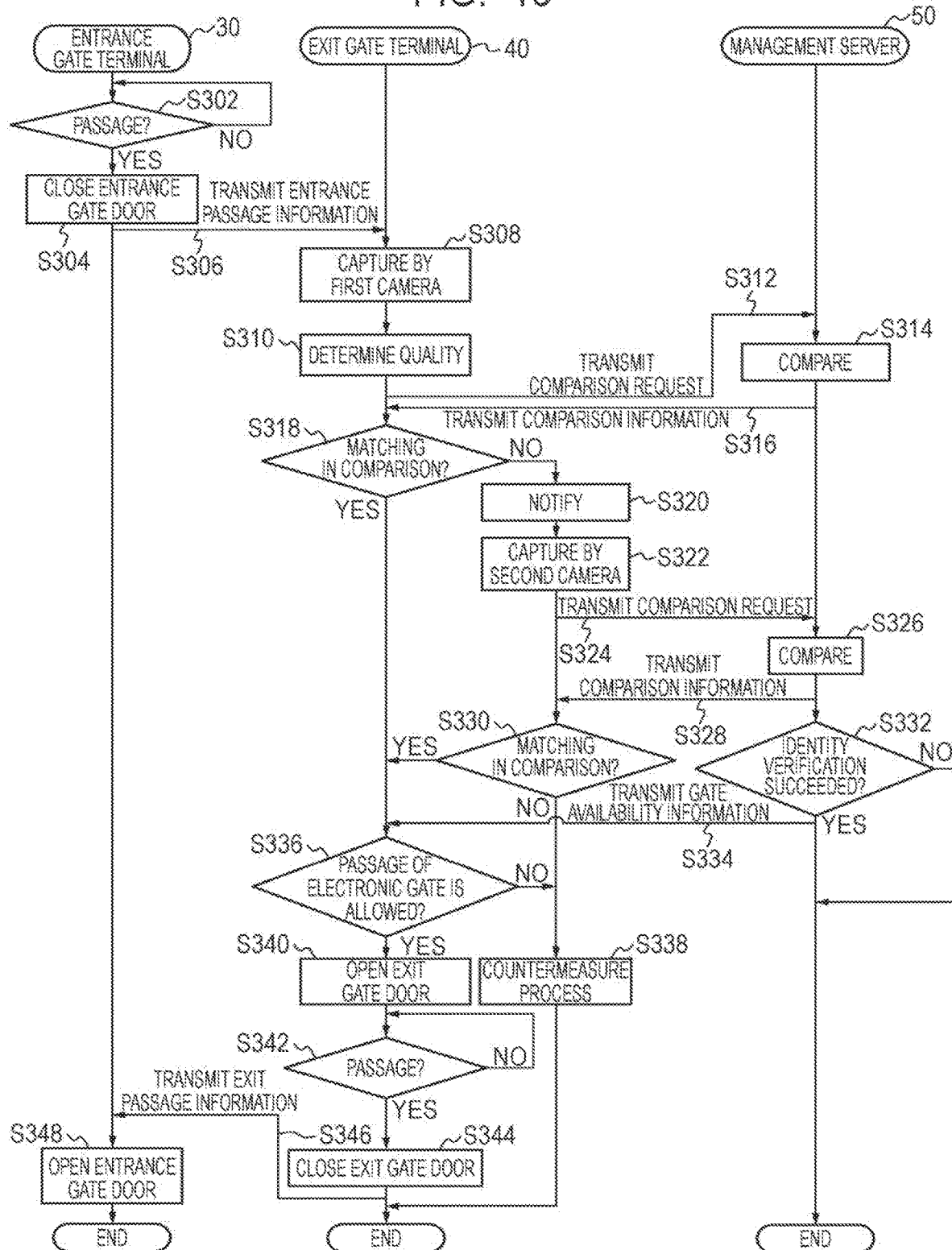
FIG. 19 is a sequence diagram illustrating the operation of the entrance gate terminal, the exit gate terminal, and the management server in the information processing system according to one example embodiment of the present invention.

Next, the operation of the electronic gate 20 to which the user U is guided by the kiosk terminal 10 will be described by using FIG. 19 and FIG. 20 together with the operation of the management server 50. FIG. 19 is a sequence diagram illustrating the operations of the entrance gate terminal 30 and the exit gate terminal 40 forming the electronic gate 20 and the management server 50.

In a standby state of the electronic gate 20 in which no user U has entered the gate passage P, the entrance gate doors 308 of the entrance gate terminal 30 are in an opened state, and the exit gate doors 414 of the exit gate terminal 40 are in a closed state. Furthermore, in the standby state, the guide indicators 314 of the entrance gate terminal 30 display an indication indicating permission of entry to the gate passage P, the guide indicators 420 of the exit gate terminal 40 display an indication indicating prohibition of exit from the gate passage P.

The user U who has complete customs declaration on the kiosk terminal 10 and been guided to the electronic gate 20 will pass through the entrance gate terminal 30 with the opened entrance gate doors 308 and enter the gate passage P.

As illustrated in FIG. 19, in the standby state, the CPU 302 of the entrance gate terminal 30 determines whether or not the user U has passed through the entrance gate terminal 30 and entered the gate passage P (step S302) and waits for passage of the user U (step S302, NO). The CPU 302 can determine whether or not the user U has passed through the entrance gate terminal 30 and entered the gate passage P based on the output signals from the plurality of the passage detection sensors 310 and the output order thereof.

If the CPU 302 determines that the user U has passed through the entrance gate terminal 30 and entered the gate passage P (step S302, YES), the CPU 302 closes the entrance gate doors 308 (step S304). Further, the CPU 302 changes the indication of the guide indicators 314 from the indication indicating permission of entry to the gate passage P to an indication indicating prohibition of entry to the gate passage P.

The entrance gate doors 308 are controlled so as not to be opened until the user U who has entered the gate passage P passes through the exit gate terminal 40 and exits the gate passage P, as described later. Thus, only a single user U can enter the gate passage P. Thereby, a situation where a plurality of users U are captured by the first camera 410 can be prevented, and a comparison of the first target face image can be reliably performed.

Further, the CPU 302 transmits, to the exit gate terminal 40, entrance passage information indicating that the user U has passed through the entrance gate terminal 30 and entered the gate passage P (step S306). Note that the CPU 302 can perform one of step S304 and step S306 in earlier order than the other or can perform both steps S304 and S306 at the same time.

The CPU 402 of the exit gate terminal 40 that has received the entrance passage information from the entrance gate terminal 30 causes the first camera 410 to capture the user U who moves toward the exit gate terminal 40 on the gate passage P and acquires the first target face image of the user U (step S308). The first camera 410 captures a moving image at a predetermined framerate or captures static images at predetermined intervals to acquire a plurality of first target face images for the user U who moves on the gate passage P. In such a way, the first target face image, which is a face image of the user U moving on the gate passage P, is captured. During capturing by the first camera 410, the user U is able to move toward the exit gate terminal 40 without stopping on the gate passage P.

During capturing by the first camera 410, the CPU 402 performs line-of-sight detection on the first target face image and, in response to determining that the user U is looking down or looking away as a result of the line-of-sight detection, can warn the user U to face forward, namely, toward the exit gate terminal 40 side. The CPU 402 can warn the user U to face forward by display on the display 408, a voice from a speaker or the like, or the like, for example. Thereby, the first target face image having a higher quality can be more reliably acquired.

When the user U does not face forward against the warning described above, the CPU 402 may neither perform the quality determination in step S310 nor the comparison request in the step S312 described later and may not perform comparison of the first target face image.

Further, during capturing by the first camera 410, the CPU 402 performs wearing item estimation on the captured first target face image and attempts to detect a wearing item on the face, such as sunglasses, glasses, a hat, or the like, in the first target face image. When a wearing item on the face is detected, the CPU 402 can perform warning that instructs the user U to put off the wearing item on the face by display on the display 408, a voice from a speaker or the like, or the like, for example. Thereby, it is possible to remove a factor which may prevent comparison of the first target face image.

When the wearing item on the face is not put off from the face of the user U against the warning described above, the CPU 402 may neither perform the quality determination in step S310 nor the comparison request in the step S312 described later and may not perform comparison of the first target face image.

The CPU 402 calculates a quality value for each of the acquired first target face images and determines the quality of the first target face image based on the calculated quality value (step S310).

The CPU 402 sequentially transmits comparison requests to the management server 50 via the network NW for high quality first target face images above a certain quality as a result of the quality determination (step S312). Thereby, the CPU 402 requests the management server 50 to compare, at 1:N, the first target face image above the certain quality with a plurality of registered face images registered in the user information DB 506*a* of the management server 50. The CPU 402 transmits a face feature amount extracted from the first target face image or the first target face image itself to the management server 50 together with the comparison request.

Note that the CPU 402 may transmit all the acquired first target face images to the management server 50 regardless of the quality. In such a case, the CPU 502 of the management server 50 can perform the quality determination on the first target face images in the same manner and perform comparison with the registered face image for the first target face images above a certain quality. Further, the CPU 502 can perform comparison between the first target face images and the registered face image regardless of the quality.

In response to receiving the comparison request of the first target face image from the exit gate terminal 40, the CPU 502 of the management server 50 performs comparison of the first target face image (step S314). The CPU 502 compares, at 1:N, the face feature amount of the first target face image received from the exit gate terminal 40 with a plurality of registered face images registered in the user information DB 506*a*. The face feature amount of the first target face image is that received from the exit gate terminal 40 or that extracted from the first target face image received from the exit gate terminal 40.

Next, the CPU 502 transmits comparison information indicating a result of the comparison of the first target face image to the exit gate terminal 40 via the network NW (step S316).

The CPU 402 of the exit gate terminal 40 and the CPU 502 of the management server 50 can repeat and perform steps S312, S314, and S316 described above for a plurality of first target faced images above a certain quality.

The CPU 402 of the exit gate terminal 40 receives comparison information from the management server 50. If the comparison information on any of the first target face images indicates that a matching registered face image was found and identity verification of the user U moving the gate passage P succeeded (step S318, YES), the CPU 402 ends capturing by the first camera 410. Subsequently, the CPU 402 proceeds to step S336.

On the other hand, if the comparison information on all the first target face images indicates that no matching registered face image was found and identity verification of the user U failed by a predetermined point of time (step S318, NO), the CPU 402 determines that identity verification by the comparison of the first target face image failed. Note that the predetermined point of time is a point of time when the user U reaches the exit gate doors 414 of the exit gate terminal 40, for example. The CPU 402 can determine whether or not the user U has reached the exit gate doors 414 from an image captured by the first camera 410.

Further, when no comparison information is received by the same predetermined point of time as described above, the CPU 402 can determine that identity verification by the comparison of the first target face image failed. In such a case, the first target face image above the certain quality cannot be acquired, no comparison between the first target face image and the registered face image may be performed.

If the CPU 402 determines that the identity verification by the comparison of the first target face image failed, the CPU 402 notifies the user U that capturing by the second camera 412 is to be performed (step S320). That is, when there is no matching in the comparison between the first target face image and the registered face image or the comparison is unable to be performed, the CPU 402 notifies the user U that capturing by the second camera 412 is performed. For example, the CPU 402 can notify that capturing by the second camera 412 is to be performed by display on the display 408, voice guidance, or the like.

Next, the CPU 402 causes the second camera 412 to capture of the user U who stops in front of the exit gate doors 414 in response to the notification (step S322). Thereby, the CPU 402 acquires the second target face image of the user U who reaches in front of the exit gate doors 414 of the exit gate terminal 40 and stops in front of the exit gate doors 414. In such a way, the second target face image, which is a face image of the user U who stops in front of the exit gate doors 414, is acquired.

The second camera 412 can acquire a plurality of face images for the user U in front of the exit gate doors 414 by capturing a moving image at a predetermined framerate or capturing static images at predetermined intervals. In such a case, the CPU 402 can select and acquire the face image of the highest quality as the second target face image of the user U out of the plurality of face images of the user U captured by the second camera 412.

The CPU 402 can guide the user U by display on the display 408, voice from a speaker or the like, or the like, for example, in capturing by the second camera 412. For example, if a wearing item on the face is detected in the second target face image, the CPU 402 can guide the user to put off the wearing item on the face or face the direction of the second camera 412 or the display 408 or the like.

Figure 20:
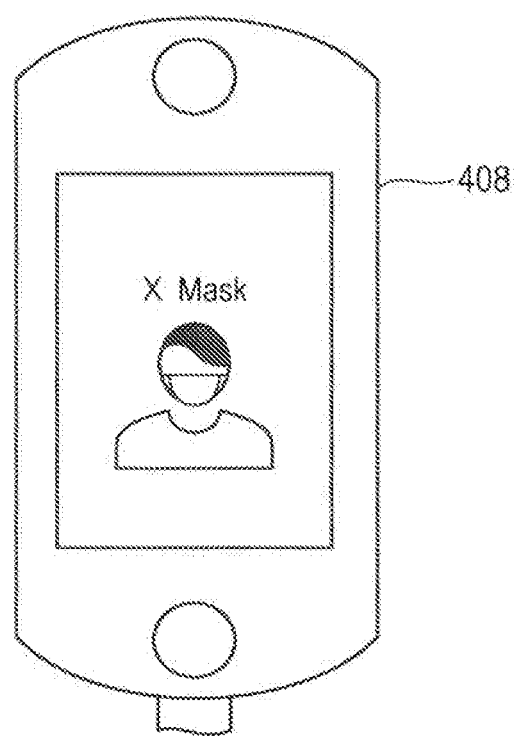
FIG. 20 is a schematic diagram illustrating one example of a notification window in the exit gate terminal according to one example embodiment of the present invention.

FIG. 20 illustrates one example of a guide window displayed on the display 408 in capturing by the second camera 412. As illustrated, with the display on the display 408, it is possible to guide the user U to put off a mask, which is a wearing item on the face.

Next, the CPU 402 transmits a comparison request to the management server 50 via the network NW for the second target face image (step S324). Thereby, the CPU 402 requests the management server 50 to compare, at 1:N, the second target face image with a plurality of registered face images registered in the user information DB 506*a* of the management server 50. The CPU 402 transmits a face feature amount extracted from the second target face image or the second target face image itself to the management server 50 together with the comparison request.

In response to receiving the comparison request of the second target face image from the exit gate terminal 40, the CPU 502 of the management server 50 performs comparison of the second target face image (step S326). The CPU 502 compares, at 1:N, the face feature amount of the second target face image received from the exit gate terminal 40 with feature amounts of a plurality of registered face images registered in the user information DB 506*a*. The face feature amount of the second target face image is that received from the exit gate terminal 40 or that extracted from the second target face image received from the exit gate terminal 40.

Next, the CPU 502 transmits comparison information indicating a result of the comparison of the second target face image to the exit gate terminal 40 via the network NW (step S328).

The CPU 402 of the exit gate terminal 40 receives comparison information from the management server 50. If the comparison information on the second target face images indicates that a matching registered face image was found and identity verification of the user U in front of the exit gate doors 414 succeeded (step S330, YES), the CPU 402 proceeds to step S336.

Note that, when there is no matching in the comparison between the second target face image and the registered face image, the exit gate terminal 40 can re-capture a second target face image by again performing step S322 of causing the second camera 412 to capture the user U to acquire the second target face image of the user U. The exit gate terminal 40 can perform re-capturing of the second target face image once or multiple times.

Further, if identity verification of the user U is successful as a result of the comparison of the first target face image or the comparison of the second target face image (step S332, YES), the CPU 502 of the management server 50 performs transmission of gate availability information (step S334). That is, the CPU 502 acquires gate availability information associated with user information on the user U whose identity verification succeeded from the user information DB 506*a* and transmits the gate availability information to the exit gate terminal 40 via the network NW.

If the comparison information on the second target face image indicates that no matching registered face image was found and identity verification of the user U failed (step S330, NO), the CPU 402 of the exit gate terminal 40 performs a countermeasure process (step S338). This case means that the identity verification of the user U failed with both of the comparison of the first target face image and the comparison of the second target face image. To call a customs officer to the gate passage P as a countermeasure process, the CPU 402 can sound an alarm or transmit a notification to a terminal of the custom officer, for example. In such a case, the customs officer may guide the user U to the manned booth M or a separate room, for example. Further, the customs officer may perform face-to-face customs inspection at an inspection stage provided on the side of the electronic gate 20 and then let the user U exit the gate passage P from the exit gate doors 414 that is manually opened.

On the other hand, the CPU 402 that proceeds to step S336 after the identity verification of the user U succeeded with the comparison of the first target face image or the comparison of the second target face image determines whether or not the user U who succeeded in the identity verification is allowed to use the electronic gate 20 (step S336). The CPU 402 determines the usage availability of the electronic gate 20 based on the gate availability information received from the management server 50.

If the CPU 402 determines that the electronic gate 20 is not allowed to be used (step S336, NO), the CPU 402 performs a countermeasure process (step S338). In such a case, the user U is a person who is determined as taxable, a person determined as risky, or the like while identity verification of the user U is successful by the comparison of the first target face image or the second target face image. To call a customs officer to the gate passage P as a countermeasure process, the CPU 402 can sound an alarm or transmit a notification to a terminal of the custom officer, for example. Also in this case, the customs officer is able to handle the user U in the same manner as described above.

On the other hand, if the CPU 402 determines that the electronic gate 20 is allowed to be used (step S336, YES), the CPU 402 opens the exit gate doors 414 (step S340). Further, the CPU 402 changes the indication of the guide indicators 420 from an indication indicating prohibition of exit from the gate passage P to an indication indicating permission of exit from the gate passage P.

Next, the CPU 402 determines whether or not the user U has passed through the exit gate terminal 40 and exited the gate passage P (step S342) and waits for passage of the user U (step S342, NO). The CPU 402 can determine whether or not the user U has passed through the exit gate terminal 40 and exited the gate passage P based on the output signals from the plurality of passage detection sensors 416 and the output order thereof.

If the CPU 402 determines that the user U has passed through the exit gate terminal 40 and exited the gate passage P (step S342, YES), the CPU 402 closes the exit gate doors 414 (step S344). Further, the CPU 402 changes the indication of the guide indicators 420 from an indication indicating permission of exit from the gate passage P to an indication indicating prohibition of exit from the gate passage P.

Further, the CPU 402 transmits, to the entrance gate terminal 30, exit passage information indicating that the user U has passed through the exit gate terminal 40 and exited the gate passage P (step S346). Note that the CPU 402 can perform one of step S344 and step S346 in earlier order than the other or can perform both steps S344 and S346 at the same time.

The CPU 302 of the entrance gate terminal 30 that received the exit passage information from the exit gate terminal 40 opens the entrance gate doors 308 (step S348). Further, the CPU 302 changes the indication of the guide indicators 314 from an indication indicating prohibition of entry to the gate passage P to an indication indicating permission of entry to the gate passage P.

In such a way, the electronic gate 20 transitions to a standby state to wait for the user U entering the gate passage P.

As discussed above, according to the present example embodiment, a captured face image used for face recognition, which is comparison of biometrics information, is captured during reading of a passport or reading of a declaration code on the kiosk terminal 10. Therefore, according to the present example embodiment, it is possible to complete procedures on the kiosk terminal 10 including acquisition of information by reading of a passport and reading of a declaration code and face recognition using the captured face image in a short time.

Further, according to the present example embodiment, in the exit gate terminal 40 of the electronic gate 20, the user U who moves toward the exit gate terminal 40 is captured by the first camera 410 to acquire a first target face image used for face recognition, which is comparison of biometrics information. Further, according to the present example embodiment, the exit gate doors 414 is opened in accordance with a determination result of gate usage availability determined in advance. Therefore, according to the present example embodiment, the time required for the user U to pass through the electronic gate 20 can be reduced.

Other Example Embodiments

Figure 21:
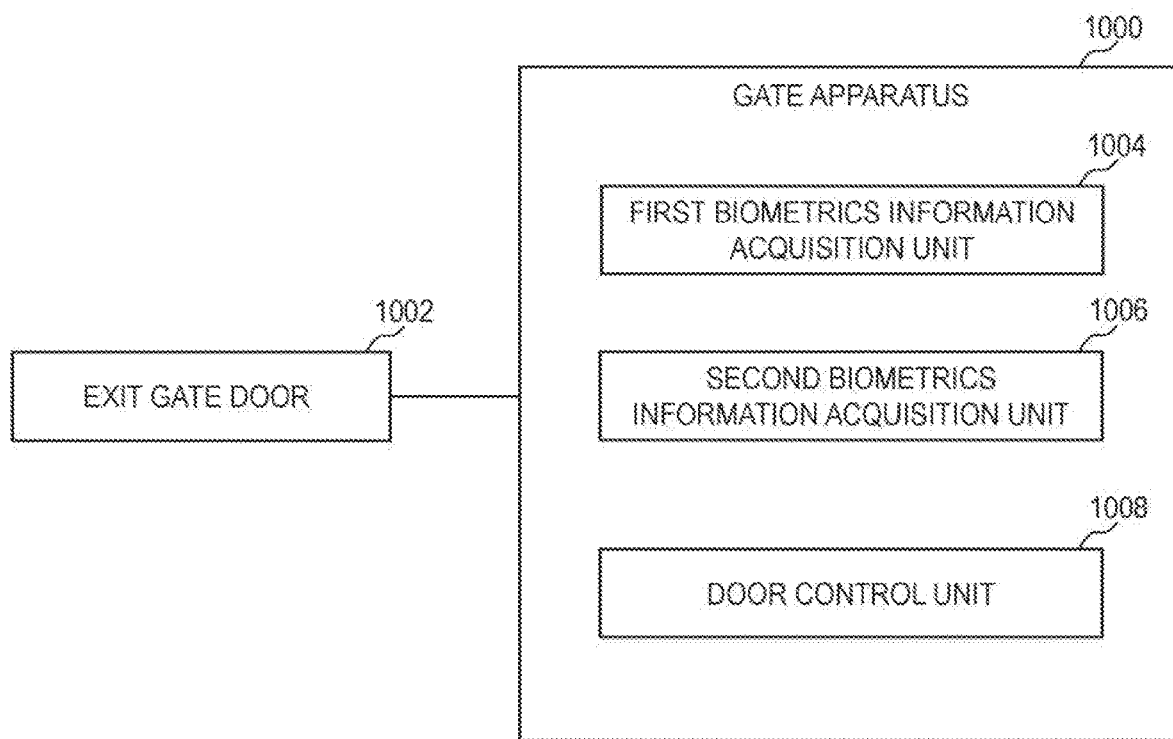
FIG. 21 is a block diagram illustrating a configuration of an information processing apparatus according to another example embodiment of the present invention.
Figure 22:
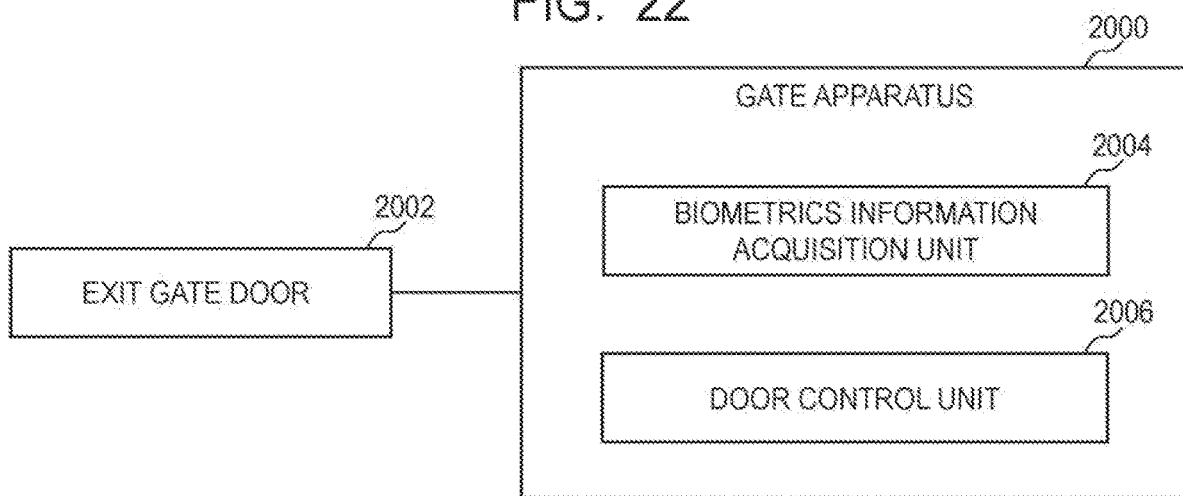
FIG. 22 is a block diagram illustrating a configuration of an information processing apparatus according to another example embodiment of the present invention.

According to another example embodiment, the gate apparatus described in the example embodiment described above can be configured as illustrated in FIG. 21 and FIG. 22. FIG. 21 and FIG. 22 are schematic diagrams illustrating the configuration of an information processing apparatus according to other example embodiments, respectively.

As illustrated in FIG. 21, the gate apparatus 1000 according to another example embodiment has an exit gate door 1002, a first biometrics information acquisition unit 1004, and a second biometrics information acquisition unit 1006, and a door control unit 1008. The first biometrics information acquisition unit 1004 acquires, from a user who moves toward the exit gate door 1002 in a closed state, first target biometrics information to be compared with registered biometrics information registered in advance. The second biometrics information acquisition unit 1006 acquires second target biometrics information to be compared with the registered biometrics information from the user who stops in front of the exit gate door 1002 when there is no matching in the comparison between the first target biometrics information and the registered biometrics information or the comparison is unable to be performed. The door control unit 1008 opens the closed exit gate door 1002 in accordance with a result of the comparison between the first target biometrics information or the second target biometrics information and the registered biometrics information.

The second biometrics information acquisition unit 1006 may also be configured to acquire the second target biometrics information to be compared with the registered biometrics information from the user who stops in front of the exit gate door 1002 in a predetermined case in addition to the above. The predetermined case as used herein is a case where the direction of the face of the user moving toward the closed exit gate door 1002 is not directed to the exit gate door 1002 or a case where a wearing item is worn by the face of the user.

According to the gate apparatus 1000 of the above another example embodiment, since the first target biometrics information to be compared with registered biometrics information registered in advance is acquired from the user moving toward the closed exit gate door 1002, the time required for passage of the user can be reduced.

Further, as illustrated in FIG. 22, a gate apparatus 2000 according to another example embodiment has an exit gate door 2002, a biometrics information acquisition unit 2004, and a door control unit 2006. The biometrics information acquisition unit 2004 acquires, from a user who moves toward the exit gate door in a closed state or stops in front of the exit gate door, target biometrics information to be compared with registered biometrics information registered in advance. The door control unit 2006 opens the closed exit gate door 2002 in accordance with a determination result for declaration information associated with the registered biometrics information which matches the target biometrics information.

According to the gate apparatus 2000 of the above another example embodiment, since the closed exit gate door 2002 is opened in accordance with a determination result for declaration information associated with registered biometrics information which matches target biometrics information, the time required for passage of the user can be reduced. [Modified Example Embodiments]

The present invention is not limited to the example embodiments described above and various modifications are possible.

For example, while the case where customs declaration is performed on the kiosk terminal 10 has been described as an example in the example embodiments described above, the invention is not limited thereto. The kiosk terminal 10 can be configured to accept various declaration by the user.

Further, while the case where the camera 116, the first camera 410, and the second camera 412 capture and acquire a face image of the user U as biometrics information on the user U has been described as an example in the example embodiments described above, the invention is not limited thereto. The camera 116, the first camera 410, the second camera 412 may acquire an iris image or the like other than a face image corresponding to face information as biometrics information on the user U.

Further, the kiosk terminal 10 according to the example embodiments described above can be configured as a system formed of one or a plurality of devices. Further, the entrance gate terminal 30 according to the example embodiments described above can be configured as a system formed of one or a plurality of devices. Further, the exit gate terminal 40 according to the example embodiments described above can be configured as a system formed of one or a plurality of devices. Further, the management server 50 according to the example embodiments described above can be configured as a system formed of one or a plurality of devices.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on (operating system) OS to perform a process in cooperation with another software or a function of an add-in board without being limited to an example that performs a process by an individual program stored in the storage medium.

An example advantage according to the invention is that the time required for a user to pass through a gate apparatus can be reduced.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A gate apparatus comprising:

an exit gate door;

a first biometrics information acquisition unit that acquires, from a user who moves toward the exit gate door in a closed state, first target biometrics information to be compared with registered biometrics information registered in advance;

a second biometrics information acquisition unit that acquires second target biometrics information to be compared with the registered biometrics information from the use who stops in front of the exit gate door when there is no matching in a comparison between the first target biometrics information and the registered biometrics information or the comparison is unable to be performed; and a door control unit that opens the exit gate door in the closed state in accordance with a result of a comparison between the first target biometrics information or the second target biometrics information and the registered biometrics information.

(Supplementary Note 2)

The gate apparatus according to supplementary note 1, wherein the door control unit opens the exit gate door in the closed state in accordance with a determination result for declaration information associated with the registered biometrics information which matches the first target biometrics information or the second target biometrics information.

(Supplementary Note 3)

The gate apparatus according to supplementary note 2, wherein the declaration information is information necessary for customs declaration.

(Supplementary Note 4)

The gate apparatus according to any one of supplementary notes 1 to 3, wherein the exit gate door is installed at an exit of a passage, the gate apparatus further comprising an entrance gate door installed at an entrance of the passage and configured to be closed when the user has entered the passage and opened when the exit gate door is opened and the user has exited the passage.

(Supplementary Note 5)

The gate apparatus according to any one of supplementary notes 1 to 4, wherein the first biometrics information acquisition unit acquires, as the first target biometrics information, first target face information to be compared with registered face information as the registered biometrics information from the user, the gate apparatus further comprising a display unit that performs display in accordance with a state of a face of the user who moves toward the exit gate door in the closed state.

(Supplementary Note 6)

The gate apparatus according to any one of supplementary notes 1 to 4 further comprising a display unit that performs display to instruct the user to stop in front of the exit gate door when there is no matching in a comparison between the first target biometrics information and the registered biometrics information or the comparison is unable to be performed.

(Supplementary Note 7)

The gate apparatus according to supplementary note 6, wherein the display unit performs the display to instruct the user to stop in front of the exit gate door and look at the display unit when there is no matching in a comparison between the first target biometrics information and the registered biometrics information or the comparison is unable to be performed.

(Supplementary Note 8)

The gate apparatus according to supplementary note 5, wherein the display unit performs the display in accordance with a state of a line of sight of the user detected from the first target face information.

(Supplementary Note 9)

The gate apparatus according to supplementary note 8, wherein the display unit displays the display that instructs the user to change a direction of the face.

(Supplementary Note 10)

The gate apparatus according to any one of supplementary notes 5, 8, and 9, wherein when a wearing item worn by the face of the user is detected, the display unit performs the display.

(Supplementary Note 11)

The gate apparatus according to any one of supplementary notes 5, 8, and 9, wherein when a wearing item worn by the face of the user is detected, the display unit performs the display to instruct the user to put off the wearing item.

(Supplementary Note 12)

The gate apparatus according to any one of supplementary notes 1 to 11, wherein the first biometrics information acquisition unit acquires a plurality of pieces of the first target biometrics information, the gate apparatus further comprising a control unit that performs a comparison between the first target biometrics information above a certain quality out of the plurality of pieces of first target biometrics information and the registered biometrics information or requests the comparison.

(Supplementary Note 13)

A gate apparatus comprising:

an exit gate door;

a first biometrics information acquisition unit that acquires, from a user who moves toward the exit gate door in a closed state, first target biometrics information to be compared with registered biometrics information registered in advance;

a second biometrics information acquisition unit that acquires second target biometrics information to be compared with the registered biometrics information from the use who stops in front of the exit gate door when a direction of a face of the user moving toward the exit gate door in the closed state is not directed to the exit gate door or a wearing item is worn by the face of the user; and a door control unit that opens the exit gate door in the closed state in accordance with a result of a comparison between the first target biometrics information or the second target biometrics information and the registered biometrics information.

(Supplementary Note 14)

A gate apparatus comprising:

an exit gate door;

a biometrics information acquisition unit that acquires target biometrics information to be compared with registered biometrics information registered in advance from a user who moves toward the exit gate door in a closed state or stops in front of the exit gate door; and a door control unit that opens the exit gate door in the closed state in accordance with a determination result for declaration information associated with the registered biometrics information which matches the target biometrics information.

(Supplementary Note 15)

A control method of a gate apparatus having an exit gate door, the control method comprising:

acquiring, from a user who moves toward the exit gate door in a closed state, first target biometrics information to be compared with registered biometrics information registered in advance;

acquiring second target biometrics information to be compared with the registered biometrics information from the use who stops in front of the exit gate door when there is no matching in a comparison between the first target biometrics information and the registered biometrics information or the comparison is unable to be performed; and opening the exit gate door in the closed state in accordance with a result of a comparison between the first target biometrics information or the second target biometrics information and the registered biometrics information.

(Supplementary Note 16)

A non-transitory storage medium storing a program that causes a gate apparatus having an exit gate door to perform:

acquiring, from a user who moves toward the exit gate door in a closed state, first target biometrics information to be compared with registered biometrics information registered in advance;

acquiring second target biometrics information to be compared with the registered biometrics information from the use who stops in front of the exit gate door when there is no matching in a comparison between the first target biometrics information and the registered biometrics information or the comparison is unable to be performed; and opening the exit gate door in the closed state in accordance with a result of a comparison between the first target biometrics information or the second target biometrics information and the registered biometrics information.

What is claimed is:

1. An apparatus comprising:
a memory configured to store one or more instructions; and
a processor configured to execute the one or more instructions to:
control a camera device to capture a first facial image of a person using a long-range capture mode;
determine whether the first facial image matches any of a plurality of registered facial images;

control the camera device to change from the long-range capture mode to a short-range capture mode based on the determination that the first facial image does not match any of the plurality of registered facial images;

control the camera device to capture a second facial image of the person using the short-range capture mode; and output information to control a barrier to allow the person to pass the barrier based on a determination that the first facial image matches one of the plurality of registered facial image or based on a determination that the second facial image matches one of the plurality of registered facial images.

2. The apparatus of claim 1, wherein in the long-range capture mode, the first facial image is captured when the person is at a first location, and in the short-range capture mode the second facial image is captured when the person is at a second location closer to the barrier than the first location.

3. The apparatus of claim 1, wherein the camera device comprises:
a first camera configured to capture the first facial image of the person, and
a second camera configured to capture the second facial image of the person.

4. The apparatus of claim 1, the camera device comprises one or more cameras configured to capture the first facial image and the second facial image.

5. The apparatus of claim 1, wherein the camera device comprises:
a first camera configured to capture the first facial image;
a second camera configured to capture the second facial image; and
a housing configured to encompass the first camera and the second camera.

6. The apparatus of claim 5, wherein the first camera is a long range camera; and
wherein the second camera is a short range camera.

7. The apparatus of claim 1, wherein the processor is further configured to output the information configured to open the barrier based on a declaration information associated with the registered facial image matching the second facial image,
wherein the declaration information is information for customs declaration.

8. The apparatus of claim 1, wherein the processor is further configured to:
output display information to a display apparatus to display information instructing the person to stop in front of the barrier when there is no match between the first facial image of the person and the plurality of registered facial images, or when the matching is unable to be performed.

9. The apparatus of claim 1, wherein the processor is further configured to:
output display information to a display apparatus to display information instructing the person to remove an item covering the face of the person when there is no match between the first facial image of the person and the plurality of registered facial images, or when the matching is unable to be performed.

10. The apparatus of claim 1, wherein the processor is further configured to:
output display information to a display apparatus to display information instructing the person to face the display apparatus when there is no match between the first facial image of the person and the plurality of registered facial images, or when the matching is unable to be performed.

11. The apparatus of claim 1, further comprising:
an exit gate, which is the barrier installed at an exit of a passageway at an airport terminal; and
an entrance gate installed at an entrance of the passageway,
wherein the processor is further configured to output information to control the entrance gate to be closed when the person has entered the passageway and output information to control the entrance gate to open when the exit gate is opened and the person has exited the passageway.

12. The apparatus of claim 1, wherein the barrier is an exit gate at an airport terminal.

13. The apparatus of claim 1, wherein the information is a control signal to control the barrier to open.

14. A method comprising:
controlling a camera device to capture a first facial image of a person using a long-range capture mode;
determining whether the first facial image matches any of a plurality of registered facial images;
controlling the camera device to change from the long-range capture mode to a short-range capture mode based on the determination that the first facial image does not match any of the plurality of registered facial images;
controlling the camera device to capture a second facial image of the person using the short-range capture mode; and
outputting information to control a barrier to allow the person to pass the barrier based on a determination that the first facial image matches one of the plurality of registered facial image or based on a determination that the second facial image matches one of the plurality of registered facial images.

15. A non-transitory computer readable medium having stored thereon a program for performing a method comprising:
controlling a camera device to capture a first facial image of a person using a long-range capture mode;
determining whether the first facial image matches any of a plurality of registered facial images;
controlling the camera device to change from the long-range capture mode to a short-range capture mode based on the determination that the first facial image does not match any of the plurality of registered facial images;
controlling the camera device to capture a second facial image of the person using the short-range capture mode; and
outputting information to control a barrier to allow the person to pass the barrier based on a determination that the first facial image matches one of the plurality of registered facial image or based on a determination that the second facial image matches one of the plurality of registered facial images.

* * * * *